United States Patent
Lin et al.

(10) Patent No.: US 12,204,610 B2
(45) Date of Patent: Jan. 21, 2025

(54) LEARNING PARAMETERS FOR GENERATIVE INPAINTING NEURAL NETWORKS UTILIZING OBJECT-AWARE TRAINING AND MASKED REGULARIZATION

(71) Applicant: Adobe Inc., San Jose, CA (US)

(72) Inventors: Zhe Lin, Fremont, CA (US); Haitian Zheng, Rochester, NY (US); Jingwan Lu, Santa Clara, CA (US); Scott Cohen, Sunnyvale, CA (US); Jianming Zhang, Campbell, CA (US); Ning Xu, Milpitas, CA (US); Elya Shechtman, Seattle, WA (US); Connelly Barnes, Seattle, WA (US); Sohrab Amirghodsi, Seattle, WA (US)

(73) Assignee: Adobe Inc., San Jose, CA (US)

(*) Notice: Subject to any disclaimer, the term of this patent is extended or adjusted under 35 U.S.C. 154(b) by 495 days.

(21) Appl. No.: 17/650,967

(22) Filed: Feb. 14, 2022

(65) Prior Publication Data
US 2023/0259587 A1    Aug. 17, 2023

(51) Int. Cl.
*G06K 9/00*    (2022.01)
*G06F 18/214*    (2023.01)
(Continued)

(52) U.S. Cl.
CPC ........... *G06F 18/2148* (2023.01); *G06N 3/08* (2013.01); *G06T 5/77* (2024.01); *G06T 7/11* (2017.01);
(Continued)

(58) Field of Classification Search
CPC .......... G06N 3/045; G06N 3/08; G06N 3/088; G06T 2207/20084; G06T 2207/20081; G06T 5/77; G06T 11/001; G06V 10/82
See application file for complete search history.

(56) References Cited

U.S. PATENT DOCUMENTS 12,056,857 B2    8/2024  Zhou et al.
2018/0374199 A1  12/2018 Shen et al.
(Continued)

FOREIGN PATENT DOCUMENTS

| CN | 111354059 A | 6/2020 | |
| GB | 2586678 A * | 3/2021 | ......... G06F 16/3344 |
| WO | 2021/212810 A1 | 10/2021 | |

OTHER PUBLICATIONS

Yu, Jiahui, et al. "Generative image inpainting with contextual attention." Proceedings of the IEEE conference on computer vision and pattern recognition. 2018. (Year: 2018).*

(Continued)

*Primary Examiner* — Gregory A Morse
*Assistant Examiner* — Owais Iqbal Memon
(74) *Attorney, Agent, or Firm* — Keller Preece PLLC

(57) ABSTRACT

The present disclosure relates to systems, methods, and non-transitory computer readable media for training a generative inpainting neural network to accurately generate inpainted digital images via object-aware training and/or masked regularization. For example, the disclosed systems utilize an object-aware training technique to learn parameters for a generative inpainting neural network based on masking individual object instances depicted within sample digital images of a training dataset. In some embodiments, the disclosed systems also (or alternatively) utilize a masked regularization technique as part of training to prevent overfitting by penalizing a discriminator neural network utilizing a regularization term that is based on an object mask. In certain cases, the disclosed systems further generate an inpainted digital image utilizing a trained generative inpainting model with parameters learned via the object-aware training and/or the masked regularization.

20 Claims, 16 Drawing Sheets

(51) Int. Cl.
  *G06N 3/08* (2023.01)
  *G06T 5/77* (2024.01)
  *G06T 7/11* (2017.01)
(52) U.S. Cl.
  CPC .............. *G06T 2207/20081* (2013.01); *G06T 2207/20084* (2013.01)

(56) References Cited

U.S. PATENT DOCUMENTS

| | | | |
|---|---|---|---|
| 2019/0196698 A1* | 6/2019 | Cohen | G10L 15/22 |
| 2020/0134834 A1 | 4/2020 | Pao et al. | |
| 2021/0150682 A1* | 5/2021 | Sytnik | G06T 19/006 |
| 2021/0248721 A1 | 8/2021 | Tian et al. | |
| 2021/0383242 A1* | 12/2021 | Ostyakov | G06T 7/11 |
| 2021/0390660 A1 | 12/2021 | Baek et al. | |
| 2021/0407051 A1 | 12/2021 | Pardeshi et al. | |
| 2022/0068037 A1 | 3/2022 | Pardeshi et al. | |
| 2022/0083806 A1* | 3/2022 | Cho | G06Q 30/0643 |
| 2022/0180490 A1* | 6/2022 | Jo | G06N 3/088 |
| 2023/0196760 A1* | 6/2023 | Dorum | G06F 18/2148 382/157 |
| 2023/0259587 A1 | 8/2023 | Lin et al. | |
| 2023/0360180 A1 | 11/2023 | Zheng et al. | |

OTHER PUBLICATIONS

Xiong, Wei, et al. "Foreground-aware image inpainting." Proceedings of the IEEE/CVF conference on computer vision and pattern recognition. 2019. (Year: 2019).*

Suvorov, Roman, et al. "Resolution-robust Large Mask Inpainting with Fourier Convolutions." arXiv preprint arXiv: 2109.07161. (Year: 2021).*

Github; PanopticFCN: Fully Convolutional Networks for Panoptic Segmentation; Date downloaded May 26, 2022; https://github.com/dvlab-research/PanopticFCN.

Search and Examination Report as received in GB application 2303646.0 dated Oct. 3, 2023.

Badour AlBahar, Jingwan Lu, Jimei Yang, Zhixin Shu, Eli Shechtman, and Jia-Bin Huang. Pose with Style: Detail-preserving pose-guided image synthesis with conditional stylegan. ACM Transactions on Graphics, 2021.

Jean-Francois Aujol, Guy Gilboa, Tony Chan, and Stanley Osher. Structure-texture image decomposition—modeling, algorithms, and parameter selection. International journal of computer vision, 67(1):111-136, 2006.

Coloma Ballester, Marcelo Bertalmio, Vicent Caselles, Guillermo Sapiro, and Joan Verdera. Filling-in by joint interpolation of vector fields and gray levels. IEEE transactions on image processing, 10(8):1200-1211, 2001.

Connelly Barnes, Eli Shechtman, Adam Finkelstein, and Dan B Goldman. Patchmatch: A randomized correspondence algorithm for structural image editing. ACM Trans. Graph., 28(3):24, 2009.

Marcelo Bertalmio, Luminita Vese, Guillermo Sapiro, and Stanley Osher. Simultaneous structure and texture image inpainting. IEEE transactions on image processing, 12(8):882-889, 2003.

Tony F Chan and Jianhong Shen. Nontexture inpainting by curvature-driven diffusions. Journal of visual communication and image representation, 12(4):436-449, 2001.

Lu Chi, Borui Jiang, and Yadong Mu. Fast fourier convolution. Advances in Neural Information Processing Systems, 33, 2020.

Taeg Sang Cho, Moshe Butman, Shai Avidan, and William T Freeman. The patch transform and its applications to image editing. In 2008 IEEE Conference on Computer Vision and Pattern Recognition, pp. 1-8. IEEE, 2008.

Antonio Criminisi, Patrick Perez, and Kentaro Toyama. Region filling and object removal by exemplar-based image inpainting. IEEE Transactions on image processing, 13(9):1200-1212, 2004.

Alexei A Efros and William T Freeman. Image quilting for texture synthesis and transfer. In Proceedings of the 28th annual conference on Computer graphics and interactive techniques, pp. 341-346. ACM, 2001.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.

Ishaan Gulrajani, Faruk Ahmed, Martin Arjovsky, Vincent Dumoulin, and Aaron Courville. Improved training of wasserstein gans. arXiv preprint arXiv:1704.00028, 2017.

Martin Heusel, Hubert Ramsauer, Thomas Unterthiner, Bernhard Nessler, and Sepp Hochreiter. Gans trained by a two time-scale update rule converge to a local nash equilibrium. Advances in neural information processing systems, 30, 2017.

Yibing Song Wei Huang Hongyu Liu, Bin Jiang and Chao Yang. Rethinking image inpainting via a mutual encoder-decoder with feature equalizations. In Proceedings of the European Conference on Computer Vision, 2020.

Xun Huang and Serge Belongie. Arbitrary style transfer in real-time with adaptive instance normalization. In Proceedings of the IEEE International Conference on Computer Vision, pp. 1501-1510, 2017.

Xun Huang, Ming-Yu Liu, Serge Belongie, and Jan Kautz. Multimodal unsupervised image-to-image translation. In Proceedings of the European conference on computer vision (ECCV), pp. 172-189, 2018.

Satoshi Iizuka, Edgar Simo-Serra, and Hiroshi Ishikawa. Globally and locally consistent image completion. ACM Transactions on Graphics (ToG), 36(4):1-14, 2017.

Justin Johnson, Alexandre Alahi, and Li Fei-Fei. Perceptual losses for real-time style transfer and super-resolution. In European conference on computer vision, pp. 694-711. Springer, 2016.

Tero Karras, Samuli Laine, and Timo Aila. A style-based generator architecture for generative adversarial networks. In Proceedings of the IEEE/CVF Conference on Computer Vision and Pattern Recognition, pp. 4401-4410, 2019.

Tero Karras, Samuli Laine, Miika Aittala, Janne Hellsten, Jaakko Lehtinen, and Timo Aila. Analyzing and improving the image quality of StyleGAN. In Proc. CVPR, 2020.

Hyunsu Kim, Yunjey Choi, Junho Kim, Sungjoo Yoo, and Youngjung Uh. Exploiting spatial dimensions of latent in gan for real-time image editing. In Proceedings of the IEEE Conference on Computer Vision and Pattern Recognition, 2021.

Diederik P Kingma and Jimmy Ba. Adam: A method for stochastic optimization.arXiv preprint arXiv:1412.6980, 2014.

Vivek Kwatra, Irfan Essa, Aaron Bobick, and Nipun Kwatra. Texture optimization for example-based synthesis. In ACM SIGGRAPH 2005 Papers, pp. 795-802. 2005.

Yanwei Li, Hengshuang Zhao, Xiaojuan Qi, Liwei Wang, Zeming Li, Jian Sun, and Jiaya Jia. Fully convolutional networks for panoptic segmentation. In Proceedings of the IEEE/CVF Conference on Computer Vision and Pattern Recognition, pp. 214-223, 2021.

Guilin Liu, Fitsum A Reda, Kevin J Shih, Ting-Chun Wang, Andrew Tao, and Bryan Catanzaro. Image inpainting for irregular holes using partial convolutions. In Proceedings of the European Conference on Computer Vision (ECCV), pp. 85-100, 2018.

Wenjie Luo, Yujia Li, Raquel Urtasun, and Richard Zemel. Understanding the effective receptive field in deep convolutional neural networks. InProceedings of the 30th International Conference on Neural Information Processing Systems, pp. 4905-4913, 2016.

Lars Mescheder, Andreas Geiger, and Sebastian Nowozin. Which training methods for gans do actually converge? In International conference on machine learning, pp. 3481-3490. PMLR, 2018.

Takeru Miyato, Toshiki Kataoka, Masanori Koyama, and Yuichi Yoshida. Spectral normalization for generative adversarial networks. arXiv preprint arXiv:1802.05957, 2018.

Kamyar Nazeri, Eric Ng, Tony Joseph, Faisal Z Qureshi, and Mehran Ebrahimi. Edgeconnect: Generative image inpainting with adversarial edge learning.arXiv preprint arXiv:1901.00212, 2019.

(56) References Cited

OTHER PUBLICATIONS

Taesung Park, Ming-Yu Liu, Ting-Chun Wang, and Jun-Yan Zhu. Semantic image synthesis with spatially-adaptive normalization. InProceedings of the IEEE Conference on Computer Vision and Pattern Recognition, 2019.
Taesung Park, Jun-Yan Zhu, Oliver Wang, Jingwan Lu, Eli Shechtman, Alexei A Efros, and Richard Zhang. Swapping autoencoder for deep image manipulation.arXiv preprint arXiv:2007.00653, 2020.
Deepak Pathak, Philipp Krahenbuhl, Jeff Donahue, Trevor Darrell, and Alexei A Efros. Context encoders: Feature learning by inpainting. In Proceedings of the IEEE conference on computer vision and pattern recognition, pp. 2536-2544, 2016.
Jialun Peng, Dong Liu, Songcen Xu, and Houqiang Li. Generating diverse structure for image inpainting with hierarchical vq-vae. In Proceedings of the IEEE/CVF Conference on Computer Vision and Pattern Recognition (CVPR), pp. 10775-10784, 2021.
Yurui Ren, Xiaoming Yu, Ruonan Zhang, Thomas H. Li, Shan Liu, and Ge Li. Structureflow: Image inpainting via structure-aware appearance flow. In IEEE International Conference on Computer Vision (ICCV), 2019.
Tim Salimans and Durk P Kingma. Weight normalization: A simple reparameterization to accelerate training of deep neural networks. Advances in neural information processing systems, 29:901-909, 2016.
Jianhong Shen and Tony F Chan. Mathematical models for local nontexture inpaintings. SIAM Journal on Applied Mathematics, 62(3):1019-1043, 2002.
Yuhang Song, Chao Yang, Yeji Shen, Peng Wang, Qin Huang, and C-C Jay Kuo. Spg-net: Segmentation prediction and guidance network for image inpainting. arXiv preprint arXiv:1805.03356, 2018.
Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky. Resolution-robust large mask inpainting with fourier convolutions.arXiv preprint arXiv:2109.07161, 2021.
Zhentao Tan, Dongdong Chen, Qi Chu, Menglei Chai, Jing Liao, Mingming He, Lu Yuan, Gang Hua, and Nenghai Yu. Semantic image synthesis via efficient class-adaptive normalization.arXiv preprint arXiv:2012.04644, 2020.
Ziyu Wan, Jingbo Zhang, Dongdong Chen, and Jing Liao. High-fidelity pluralistic image completion with transformers. arXiv preprint arXiv:2103.14031, 2021.
Xintao Wang, Ke Yu, Chao Dong, and Chen Change Loy. Recovering realistic texture in image super-resolution by deep spatial feature transform. In Proceedings of the IEEE conference on computer vision and pattern recognition, pp. 606-615, 2018.
Zhou Wang, Alan C Bovik, Hamid R Sheikh, Eero P Simoncelli, et al. Image quality assessment: from error visibility to structural similarity.IEEE transactions on image processing, 13(4):600-612, 2004.
Wei Xiong, Jiahui Yu, Zhe Lin, Jimei Yang, Xin Lu, Connelly Barnes, and Jiebo Luo. Foreground-aware image inpainting. InProceedings of the IEEE/CVF Conference on Computer Vision and Pattern Recognition, pp. 5840-5848, 2019.
Chao Yang, Xin Lu, Zhe Lin, Eli Shechtman, Oliver Wang, and Hao Li. High-resolution image inpainting using multi-scale neural patch synthesis. In 2017 IEEE Conference on Computer Vision and Pattern Recognition, CVPR 2017, Honolulu, HI, USA, Jul. 21-26, 2017, pp. 4076-4084, 2017.
Jie Yang, Zhiquan Qi, and Yong Shi. Learning to incorporate structure knowledge for image inpainting. InProceedings of the AAAI Conference on Artificial Intelligence, vol. 34, pp. 12605-12612, 2020.
Zili Yi, Qiang Tang, Shekoofeh Azizi, Daesik Jang, and Zhan Xu. Contextual residual aggregation for ultra high-resolution image inpainting. In Proceedings of the IEEE/CVF Conference on Computer Vision and Pattern Recognition, pp. 7508-7517, 2020.
Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.
Jiahui Yu, Zhe Lin, Jimei Yang, Xiaohui Shen, Xin Lu, and Thomas S Huang. Free-form image inpainting with gated convolution. In Proceedings of the IEEE International Conference on Computer Vision, pp. 4471-4480, 2019.
Yu Zeng, Zhe Lin, Huchuan Lu, and Vishal M. Patel. Cr-fill: Generative image inpainting with auxiliary contextual reconstruction. InProceedings of the IEEE International Conference on Computer Vision, 2021.
Yu Zeng, Zhe Lin, Jimei Yang, Jianming Zhang, Eli Shechtman, and Huchuan Lu. High-resolution image inpainting with iterative confidence feedback and guided upsampling. arXiv preprint arXiv:2005.11742, 2020.
Richard Zhang, Phillip Isola, Alexei A Efros, Eli Shechtman, and Oliver Wang. The unreasonable effectiveness of deep features as a perceptual metric. In Proceedings of the IEEE Conference on Computer Vision and Pattern Recognition, pp. 586-595, 2018.
Shengyu Zhao, Jonathan Cui, Yilun Sheng, Yue Dong, Xiao Liang, Eric I Chang, and Yan Xu. Large scale image completion via co-modulated generative adversarial networks. arXiv preprint arXiv:2103.10428, 2021.
Haitian Zheng, Haofu Liao, Lele Chen, Wei Xiong, Tianlang Chen, and Jiebo Luo. Example-guided image synthesis using masked spatial-channel attention and self-supervision. In European Conference on Computer Vision, pp. 422-439. Springer, 2020.
Bolei Zhou, Agata Lapedriza, Aditya Khosla, Aude Oliva, and Antonio Torralba. Places: A 10 million image database for scene recognition. IEEE transactions on pattern analysis and machine intelligence, 40(6):1452-1464, 2017.
Haoming Cai, Jingwen He, Yu Qiao and Chao Dong, "Toward Interactive Modulation for Photo-Realistic Image Restoration," 2021 IEEE/CV Conference on Computer Vision and Pattern Recognition Workshops (CVPRW), Nashville, TN, USA, 2021, pp. 294-303, doi:10.1109/CVPRW53098.2021.00039 (Year: 2021).
Karras, T., Laine, S., Aittala, M., Hellsten, J., Lehtinen, J., and Aila, T., "Analyzing and Improving the Image Quality of StyleGAN", arXiv e-prints, 2019. doi:10.48550/arXiv.1912.04958 (Year: 2019).
Kim, H., Choi, Y., Kim, J., Yoo, S., and Uh, Y., "Exploiting Spatial Dimensions of Latent in GAN for Real-time Image Editing", arXiv e-prints, 2021. doi:10.48550/arXiv.2104.14754 (Year: 2021).
Suvorov, R., "Resolution-robust Large Mask Inpainting with Fourier Convolutions", arXiv e-prints, 2021. doi: 10.48550/arXiv.2109.07161 (Year: 2021).
Xiao, Q., Li, G., and Chen, Q., "Deep Inception Generative Network for Cognitive Image Inpainting", arXiv e-prints, 2018. doi:10.48550/arXiv.1812.01458 (Year: 2018).
Zhao, S., "Large Scale Image Completion via Co-Modulated Generative Adversarial Networks", arXiv e-prints, 2021. doi: 10.48550/arXiv.2103.10428 (Year: 2021).
Zhu, M., "Image Inpainting by End-to-End Cascaded Refinement With Mask Awareness", IEEE Transactions on Image Processing, vol. 30, IEEE, pp. 4855-4866, 2021. doi:10.1109/TIP.2021.3076310 (Year: 2021).
U.S. Appl. No. 17/661,985, filed Jul. 26, 2024, Notice of Allowance.
Hiya Roy, et al. "Image inpainting using frequency-domain priors." Journal of Electronic Imaging 30.2 (2021): 023016-023016.
Rui Xu, et al. "Positional encoding as spatial inductive bias in gans." Proceedings of the IEEE/CVF Conference on Computer Vision and Pattern Recognition. 2021.
Yu, Yingchen, et al. "Diverse image inpainting with bidirectional and autoregressive transformers." Proceedings of the 29th ACM International Conference on Multimedia. 2021.

\* cited by examiner

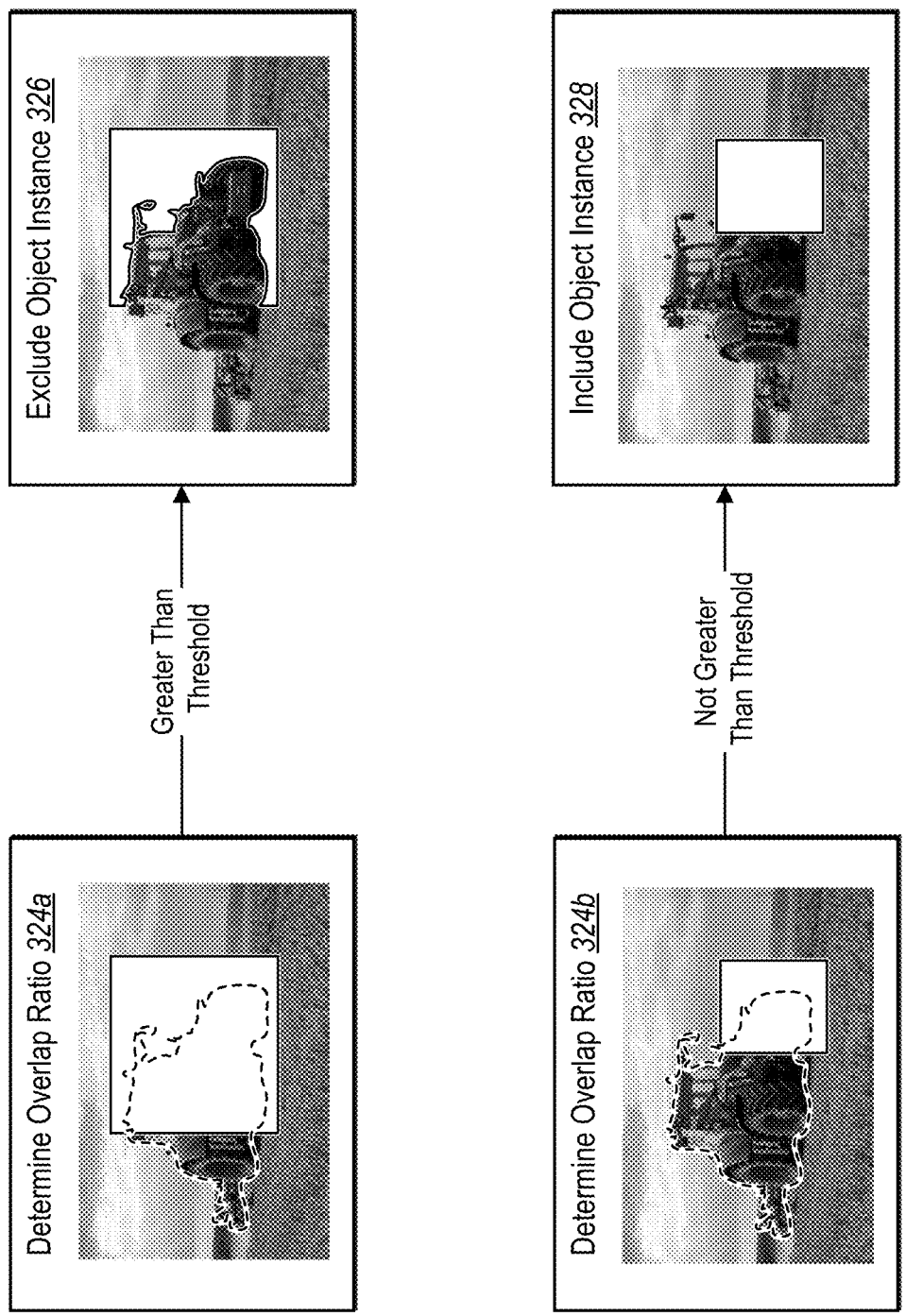

| Methods | FID | LPIPS | U-IDS | P-IDS |
|---|---|---|---|---|
| Generative Inpainting Neural Network Without Masked Regularization | 2.530 | 0.221 | 36.59 | 21.10 |
| Generative Inpainting Neural Network With Masked Regularization | 2.475 | 0.221 | 36.58 | 21.55 |

Fig. 6

LEARNING PARAMETERS FOR GENERATIVE INPAINTING NEURAL NETWORKS UTILIZING OBJECT-AWARE TRAINING AND MASKED REGULARIZATION

BACKGROUND

In the field of digital image editing, deep generative models have become increasingly effective in various applications such as producing realistic images from randomly sampled seeds or image inpainting. These models, such as generative adversarial networks ("GANs"), have revolutionized digital image synthesis, enabling photorealistic rendering of complex phenomena and inpainting digital images with missing or flawed pixels. Indeed, GANs have made significant progress in synthesizing images which appear photorealistic. Despite the advances of conventional digital image systems that utilize these models, however, these conventional systems continue to suffer from a number of disadvantages, such as inaccuracy in generating inpainted digital images along object borders and/or for images with large holes as well as inefficiency in training generative inpainting neural networks.

SUMMARY

This disclosure describes one or more embodiments of systems, methods, and non-transitory computer readable media that solve one or more of the foregoing or other problems in the art by utilizing a unique training process to learn parameters for a generative inpainting neural network based on the principle of tailoring the training process to real-world inpainting use cases. For example, the disclosed systems utilize an object-aware training technique to learn parameters for a generative inpainting neural network based on masking individual object instances depicted within sample digital images of a training dataset. In some embodiments, the disclosed systems also (or alternatively) utilize a masked regularization technique as part of training to prevent overfitting by penalizing a discriminator neural network utilizing a regularization term that is based on an object mask. In certain cases, the disclosed systems further generate an inpainted digital image utilizing a trained generative inpainting model with parameters learned via the object-aware training and/or the masked regularization.

BRIEF DESCRIPTION OF THE DRAWINGS

This disclosure describes one or more embodiments of the invention with additional specificity and detail by referencing the accompanying figures. The following paragraphs briefly describe those figures, in which:

FIGS. 3A-3E illustrate an example process of object-aware training in accordance with one or more embodiments;

FIG. 6 illustrates a table of experimental results in accordance with one or more embodiments;

DETAILED DESCRIPTION

Figure 1:
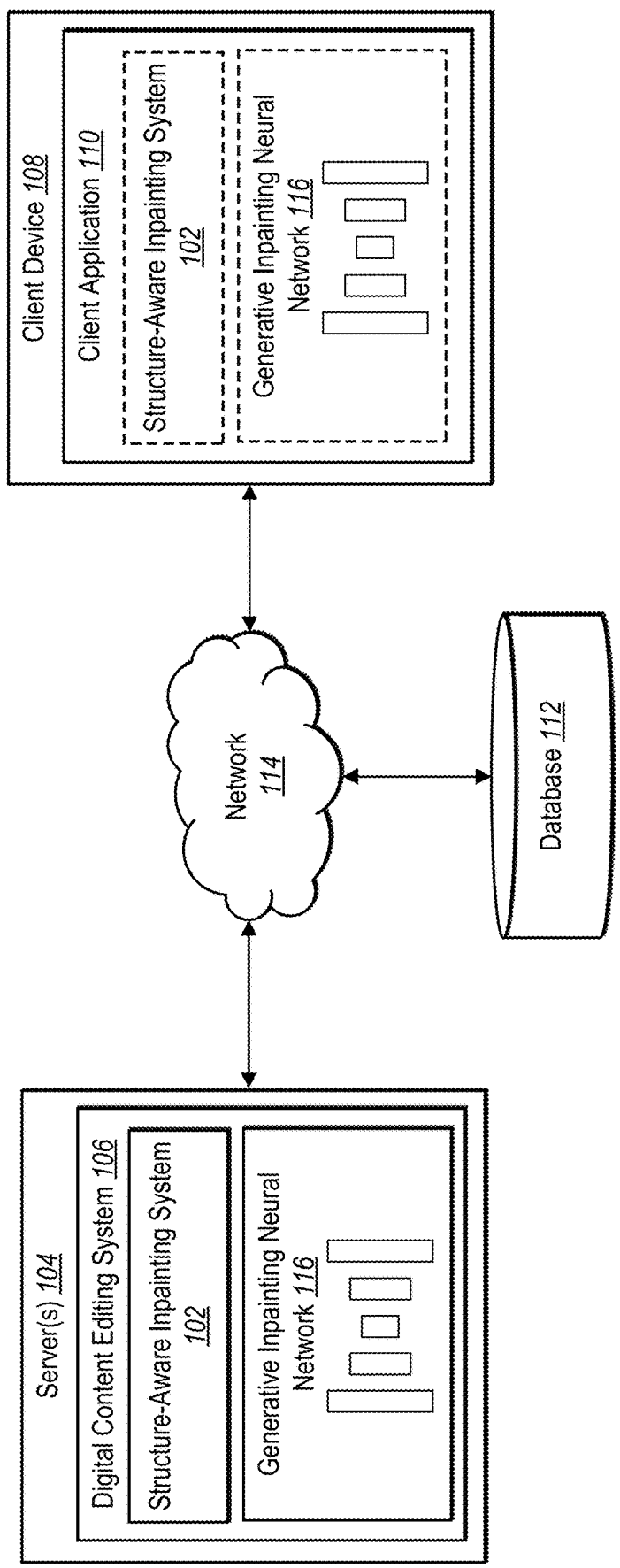
FIG. 1 illustrates an example system environment in which a structure-aware inpainting system operates in accordance with one or more embodiments.

This disclosure describes one or more embodiments of a structure-aware inpainting system that learns parameters for a generative inpainting neural network utilizing a novel training technique not found in prior systems. In practical scenarios, inpainting digital images often requires training generative neural networks to identify pixels for replacing missing, flawed, or otherwise undesirable regions (or "holes") within digital images. To date, many existing digital image systems train generative neural networks with datasets that poorly represent real-world use cases and that, consequently, often generate inaccurate inpainted digital images when trained. Motivated by this issue, the structure-aware inpainting system utilizes a training technique that includes generating synthetic digital image masks for sample digital images in a dataset to resemble hole regions and/or that includes a masked regularization for improved accuracy. Specifically, the structure-aware inpainting system trains a generative inpainting neural network using object-aware training and/or masked regularization.

As just mentioned, in one or more embodiments, the structure-aware inpainting system learns parameters for a generative inpainting neural network utilizing object-aware training. In particular, the structure-aware inpainting system utilizes a mask generation scheme tailored for real-world use cases (e.g., object removal and completion). For example, the structure-aware inpainting system leverages instance-level segmentation to generate sample digital images with object-aware masks that simulate real distractor or clutter removal use cases. In some cases, the structure-aware inpainting system filters out sample digital images where an entire object (or a large part of it) is covered by a mask to prevent the generator from learning to produce distorted objects or color blobs. Furthermore, the structure-aware inpainting system provides precise object boundaries for depicted objects, and thus, prevents a trained generative inpainting neural network from leaking pixel colors (e.g., where non-object pixel colors bleed with object pixel colors or vice-versa) at object boundaries.

As also mentioned, in certain embodiments, the structure-aware inpainting system learns parameters for a generative inpainting neural network utilizing masked regularization. To elaborate, the structure-aware inpainting system utilizes a modified regularization technique such as R1 regularization that is tailored specifically for inpainting digital images. For instance, the structure-aware inpainting system modifies an R1 regularization term to avoid computing penalties on a partial image and to thus impose a better separation of input conditions from generated outputs. In some cases, the structure-aware inpainting system modifies R1 regularization utilizing a digital image mask to form a masked R1 regularization term. By utilizing masked regularization, in one or more embodiments, the structure-aware inpainting system reduces or eliminates harmful impacts of computing regularization on a background of a digital image.

In one or more embodiments, the structure-aware inpainting system utilizes a trained generative inpainting neural network to generate an inpainted digital image. More specifically, the structure-aware inpainting system trains a generative inpainting neural network using one or more of the aforementioned techniques (e.g., object-aware training and/or masked regularization) and further applies the trained generative inpainting neural network to generate an inpainted digital image. For example, the structure-aware inpainting system generates an inpainted digital image by utilizing the generative inpainting neural network to fill or replace a hole region with replacement pixels identified from the digital image (as dictated by network parameters learned via the training process).

As suggested above, many conventional digital image systems exhibit a number of shortcomings or disadvantages, particularly in accuracy and efficiency. For example, due to their limiting training processes, conventional systems often generate inaccurate inpainted digital images that include unwanted or jarring artifacts and/or that depict color bleeding. More particularly, because conventional systems usually only sample rectangular or irregularly shaped masks (or a combination of the two), the neural networks trained by these systems often struggle to generate accurate results when filling more complicated hole regions beyond simple shapes or blobs. Indeed, experimenters have demonstrated that, due to their training limitations, conventional systems often generate inpainted digital images with unexpected and visually jarring artifacts within hole regions (e.g., floating heads or other pixel bodies misplaced in various regions). Even certain existing systems that attempt to remediate these issues with saliency annotation continue to show issues because saliency annotation only captures large dominant foreground objects and leaves background objects (possibly covered by large hole regions). To this point, saliency detection does not work well for object completion (e.g., reconstructing an object from a partially masked one) because it generally predicts only the most obvious objects while ignoring surrounding objects, leading to ambiguity during training.

In addition to their inaccuracy, some conventional digital image systems inefficiently consume computing resources such as processing power and memory. Indeed, training generative inpainting models is computationally expensive, often requiring hours, days, or weeks to complete. Existing digital image systems that train using conventional datasets with irregularly shaped masks and/or standard regularization take an especially long amount of time (and therefore an especially large amount of processing power and memory) to converge, expending computing resources that could otherwise be preserved with more efficient training techniques.

As suggested above, embodiments of the structure-aware inpainting system provide a variety of improvements or advantages over conventional image modification systems. For example, embodiments of the structure-aware inpainting system utilize a novel training technique not found in prior systems. To elaborate, the structure-aware inpainting system utilizes a training technique that involves object-aware training and/or masked regularization, neither of which are implemented by prior systems. For example, the structure-aware inpainting system generates a dataset of masked digital image from which to sample that includes masked digital images depicting object instance masks (that are further used for determining overlap ratios as part of training). In addition, the structure-aware inpainting system utilizes masked regularization to specifically focus the computation of gradient penalties on unmasked pixels and to avoid computing regularization outside masked pixels (therefore resulting in more stable training as well).

Due at least in part to implementing a new training technique, in some embodiments, the structure-aware inpainting system improves accuracy over conventional digital image systems. While some existing systems' training processes lead to generating unwanted artifacts in strange locations within hole regions (particularly larger hole regions), one or more embodiments of the object-aware training and masked regularization of the structure-aware inpainting system greatly improve the accuracy of generating inpainted digital images. As discussed in further detail below, experimenters have demonstrated the accuracy improvements that result from the training process of one or more embodiments of the structure-aware inpainting system, generating final results that do not depict unwanted artifacts and that appear more visually coherent.

Additionally, embodiments of the structure-aware inpainting system also improve efficiency over conventional digital image systems. For example, compared to conventional systems, the structure-aware inpainting system trains a generative neural network using fewer computing resources such as processing power and memory. By utilizing the object-aware training and/or masked regularization described herein, the structure-aware inpainting system converges faster than prior systems, thus preserving computing resources compared to prior systems. Indeed, in some cases, the novel training technique of the structure-aware inpainting system is faster and more stable than that of conventional systems, requiring fewer training iterations or epochs to converge.

Additional detail regarding the structure-aware inpainting system will now be provided with reference to the figures. For example, FIG. 1 illustrates a schematic diagram of an example system environment for implementing a structure-aware inpainting system 102 in accordance with one or more embodiments. An overview of the structure-aware inpainting system 102 is described in relation to FIG. 1. Thereafter, a more detailed description of the components and processes of the structure-aware inpainting system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user (e.g., a digital image editor). The client device 108 communicates with the server(s) 104 via the network 114. For example, the client device 108 provides information to server(s) 104 indicating client device interactions (e.g., digital image selections, user interactions requesting generation or modification of digital images, or other input) and receives information from the server(s) 104 such as generated inpainted digital images. Thus, in some cases, the structure-aware inpainting system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as inpainted digital images, masked digital images, and/or selectable options for generating and editing digital images (e.g., to indicate objects to remove and/or inpaint). In some cases, the client application 110 includes all or part of the structure-aware inpainting system 102 and/or the generative inpainting neural network 116.

As illustrated in FIG. 1, the environment includes the server(s) 104. The server(s) 104 generates, tracks, stores, processes, receives, and transmits electronic data, such as indications of client device interactions and/or pixels of digital images. For example, the server(s) 104 receives data from the client device 108 in the form of an indication of a client device interaction to generate an inpainted digital image. In response, the server(s) 104 transmits data to the client device 108 to cause the client device 108 to display or present an inpainted digital image based on the client device interaction.

In some embodiments, the server(s) 104 communicates with the client device 108 to transmit and/or receive data via the network 114, including client device interactions, inpainted digital images, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, or a machine learning server. The server(s) 104 further access and utilize the database 112 to store and retrieve information such as a generative inpainted neural network (e.g., the generative inpainting neural network 116), stored sample digital images for training, and/or generated inpainted digital images.

As further shown in FIG. 1, the server(s) 104 also includes the structure-aware inpainting system 102 as part of a digital content editing system 106. For example, in one or more implementations, the digital content editing system 106 is able to store, generate, modify, edit, enhance, provide, distribute, and/or share digital content, such as digital images. For example, the digital content editing system 106 provides tools for the client device 108, via the client application 110, to generate and modify digital images.

In one or more embodiments, the server(s) 104 includes all, or a portion of, the structure-aware inpainting system 102. For example, the structure-aware inpainting system 102 operates on the server(s) to train a generative inpainted neural network to generate inpainted digital images. In some cases, the structure-aware inpainting system 102 utilizes, locally on the server(s) 104 or from another network location (e.g., the database 112), a generative inpainting neural network 116 including one or more constituent neural networks such as an encoder neural network, a generator neural network, and/or a discriminator neural network.

In certain cases, the client device 108 includes all or part of the structure-aware inpainting system 102. For example, the client device 108 generates, obtains (e.g., download), or utilizes one or more aspects of the structure-aware inpainting system 102, such as the generative inpainting neural network 116, from the server(s) 104. Indeed, in some implementations, as illustrated in FIG. 1, the structure-aware inpainting system 102 is located in whole or in part on the client device 108. For example, the structure-aware inpainting system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the structure-aware inpainting system 102. For example, in some embodiments, the server(s) 104 train one or more neural networks discussed herein and provide the one or more neural networks to the client device 108 for implementation (e.g., to generate inpainted digital images at the client device 108). In some embodiments, the server(s) 104 train one or more neural networks, the client device 108 requests an inpainted digital image, the server(s) 104 generate an inpainted digital image utilizing the one or more neural networks and provide the inpainted digital image to the client device 108. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the structure-aware inpainting system 102 is implemented by (e.g., located entirely or in part on) the client device 108. In addition, in one or more embodiments, the client device 108 communicates directly with the structure-aware inpainting system 102, bypassing the network 114. Further, in some embodiments, the digital image collaging neural network 116 is stored in the database 112, maintained by the server(s) 104, the client device 108, or a third-party device.

Figure 2:
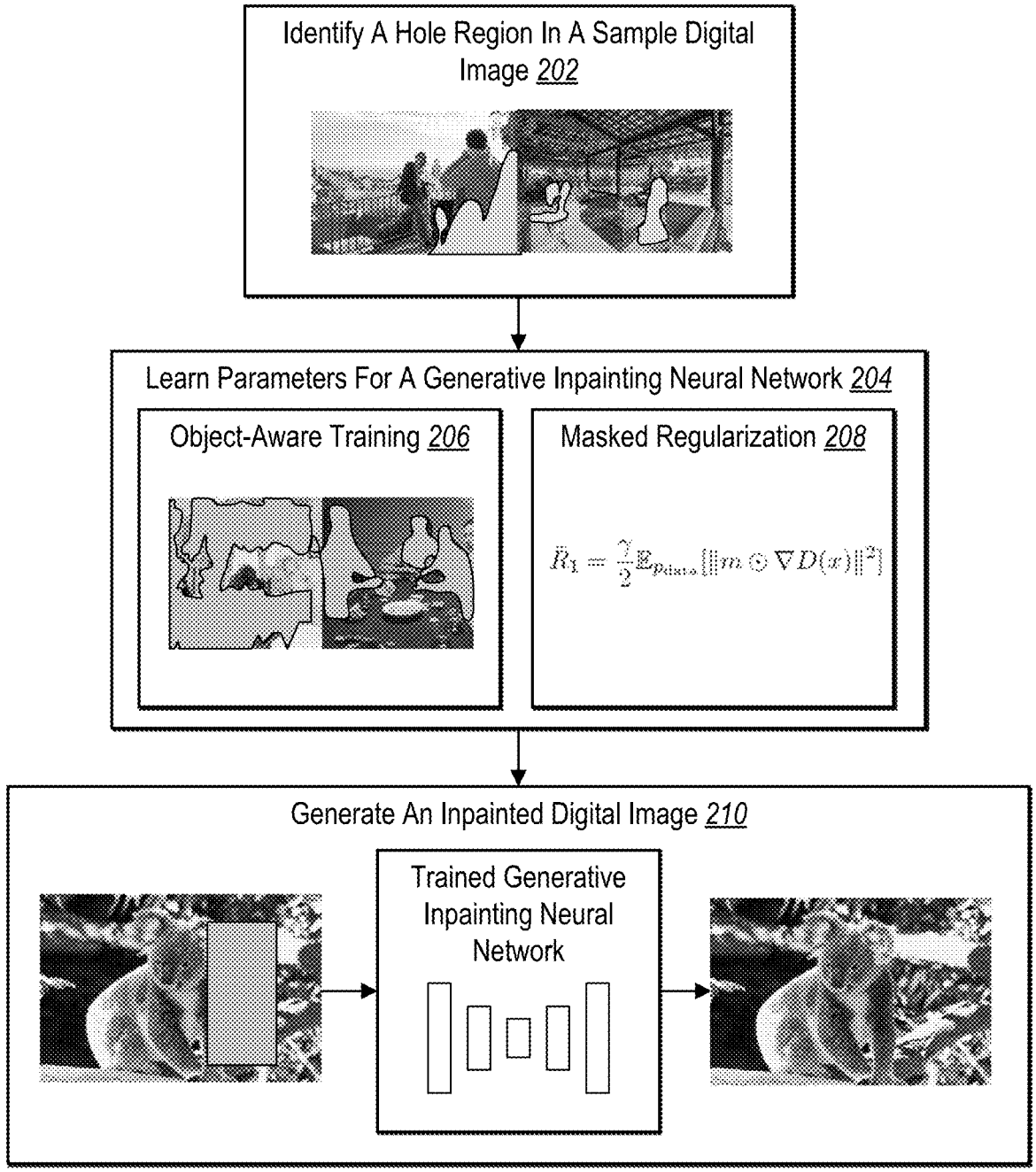
FIG. 2 illustrates an overview of training a generative inpainting neural network to generate an inpainted digital image via object-aware training and masked regularization in accordance with one or more embodiments.

As mentioned, in one or more embodiments, the structure-aware inpainting system 102 trains a generative inpainting neural network using a novel training technique that includes object-aware training and masked regularization. In particular, the structure-aware inpainting system 102 learns parameters for a generative inpainting neural network to accurately inpaint or fill missing, flawed, or otherwise undesirable pixels in one or more regions. FIG. 2 illustrates an overview of training a generative inpainting neural network via object-aware training and masked regularization to generate an inpainted digital image in accordance with one or more embodiments. Additional detail regarding the various acts of FIG. 2 is provided thereafter with reference to subsequent figures.

As illustrated in FIG. 2, the structure-aware inpainting system 102 performs an act 202 to identify a hole region in a sample digital image. More specifically, the structure-aware inpainting system 102 identifies or determines a region of pixels within a sample digital image to replace with replacement pixels. For instance, the structure-aware inpainting system 102 identifies a hole region based on user interaction indicating or defining a region of pixels to replace. In some case, the structure-aware inpainting system 102 identifies a hole region by generating a digital image mask via segmentation. In some embodiments, the structure-aware inpainting system 102 generates a set of sample digital images with hole regions indicating pixels to replace to be used during the training process. In one or more embodiments, a hole region includes a region, a portion, an area, or a set of one or more pixels within a digital image that are to be replaced (or filled) with replacement pixels. For instance, a hole region is defined or indicated by a digital image mask determined via user interaction (e.g., selecting an object or portion of a digital image to remove) or otherwise generated by the structure-aware inpainting system 102.

As further illustrated in FIG. 2, the structure-aware inpainting system 102 performs an act 204 to learn parameters for a generative inpainting neural network. In particular, the structure-aware inpainting system 102 learns parameters via a training or tuning process. As shown, the structure-aware inpainting system 102 utilizes one or more unique training methods such as object-aware training 206 and/or masked regularization 208 to learn the parameters for a generative inpainting neural network. To train a generative inpainting neural network, in some cases, the structure-aware inpainting system 102 utilizes an iterative training process that repeats for a number of iterations or epochs until the generative inpainting neural network (including its inner networks such as an encoder neural network and a generator neural network) satisfies a threshold measure of accuracy.

In some embodiments, the term neural network refers to a machine learning model that is trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network includes a convolutional neural network, a recurrent neural network (e.g., an LSTM), a graph neural network, a generative adversarial neural network, or other architecture.

Relatedly, a generative adversarial neural network (sometimes simply GAN) includes a neural network that is tuned or trained via an adversarial process to generate an output digital image (e.g., from an input digital image). In some cases, a generative adversarial neural network includes multiple constituent neural networks such as an encoder neural network and one or more generator neural networks. For example, an encoder neural network extracts latent code from a noise vector or from a digital image. A generator neural network (or a combination of generator neural networks) generates a modified digital image by combining extracted latent code (e.g., from the encoder neural network). During training, a discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the structure-aware inpainting system 102 to modify parameters of the encoder neural network and/or the one or more generator neural networks to eventually generate digital images that fool the discriminator neural network into indicating that a generated digital image is a real digital image.

Along these lines, a generative adversarial neural network refers to a neural network having a specific architecture or a specific purpose such as a generative inpainting neural network. For example, a generative inpainting neural network includes a generative adversarial neural network that inpaints or fills pixels of a digital image with replacement pixels. In some cases, a generative inpainting neural network inpaints a digital image by filling hole regions (indicated by digital image masks) which include pixels determine to be, or otherwise designated as, flawed, missing, or otherwise undesirable. Indeed, as mentioned above, in some embodiments a digital image mask defines a hole region using a segmentation or a mask indicating, overlaying, covering, or outlining pixels to be removed or replaced within a digital image.

For each training iteration, the structure-aware inpainting system 102 implements the object-aware training 206 by performing one or more steps pertaining to objects identified within a sample digital image. For example, the structure-aware inpainting system 102 generates a set of object masks indicating or outlining objects identified within a sample digital image. In one or more embodiments, the structure-aware inpainting system 102 generates object masks utilizing a segmentation model, such as a segmentation neural network, to determine or generate object segmentations indicating boundaries of individual object instances (e.g., differentiating between instances of common object types). In one or more implementations, the segmentation model comprises a panoptic segmentation neural network.

As part of the object-aware training 206, the structure-aware inpainting system 102 further selects a masked digital image from a set of masked digital images. For example, the structure-aware inpainting system 102 generates a set of masked digital images that include or depict different types of masks. In some cases, a masked digital image includes masked object instances that the structure-aware inpainting system 102 generates from object segmentations indicating boundaries of individual object instances. Indeed, a masked object instance, in one or more embodiments, includes an object instance that has been specifically masked according to its segmentation (as determined via a segmentation neural network), where the mask excludes other pixels outside of, or other than, those indicated by a specific object instance segmentation. In these or other cases, a masked digital image includes a random pattern mask that the structure-aware inpainting system 102 generates using random strokes and/or rectangles (or other polygons or non-polygon shapes). For a given training iteration, the structure-aware inpainting system 102 thus (randomly or probabilistically) selects a masked digital image from the set of masked digital images.

Additionally, in one or more implementations, the structure-aware inpainting system 102 determines or computes an overlap ratio associated with the masked digital image. More particularly, as part of a training iteration, the structure-aware inpainting system 102 determines an overlap ratio indicating a measure or an amount (e.g., a proportion or a percentage) of overlap between a digital image mask (indicating a hole region to inpaint) and each masked object instance in the digital image (indicating a particular object instance within a sample digital image). In some cases, the structure-aware inpainting system 102 further compares the overlap ratio with an overlap ratio threshold that indicates whether to exclude the object instance from the hole region (e.g., to prevent sampling pixels of the object when inpainting to avoid or prevent generating random nonsensical artifacts from the object/hole when inpainting). Additional detail regarding the object-aware training 206 is provided below with reference to subsequent figures.

In addition, for each training iteration, the structure-aware inpainting system 102 implements masked regularization 208 to modify parameters of a generative inpainting neural network. To elaborate, the structure-aware inpainting system 102 utilizes a regularization technique to penalize a discriminator neural network during training to prevent or reduce overfitting. For instance, the structure-aware inpainting system 102 leverages a digital image mask (indicating a hole region) within a digital image as part of a regularization technique to avoid computing gradient penalties inside the mask, thereby reducing potential harmful impact of computing the regularization outside the hole region. In some cases, the structure-aware inpainting system 102 utilizes a particular type of regularization such as R1 regularization that also incorporates the digital image mask. Additional detail regarding the masked regularization 208 is provided below with reference to subsequent figures.

In one or more embodiments, the structure-aware inpainting system 102 repeats a training process for multiple iterations or epochs. For example, the structure-aware inpainting system 102 repeats, for each iteration, the process of: i) sampling a masked digital image from a set of masked digital images (including masked object instances and/or random pattern masks), ii) determining an overlap ratio between a digital image mask of the masked digital image and each object instance within the masked digital image, iii) comparing the overlap ratio with an overlap ratio threshold (and modifying any masks motivated by the comparison), iv) generating an inpainted digital image utilizing the generative inpainting neural network, v) comparing the inpainted digital image with a stored (e.g., real) digital image utilizing a discriminator neural network as dictated by masked regularization, vi) generating an authenticity prediction designating the inpainted digital image as real or fake based on the comparison, and vii) modifying or updating parameters of the generative inpainting neural network and/or discriminator based on the authenticity prediction. In some embodiments, the structure-aware inpainting system 102 repeats the training process until, based on its learned parameters, the generator neural network (of the generative inpainting neural network) fools the discriminator neural network into predicting that an inpainted digital image is real (at least threshold number of consecutive or non-consecutive times). In some cases, the structure-aware inpainting system 102 may omit or reorder one or more of the aforementioned steps of the training process for one or more iterations.

As further illustrated in FIG. 2, the structure-aware inpainting system 102 performs an act 210 to generate an inpainted digital image. In particular, the structure-aware inpainting system 102 utilizes a trained generative inpainting neural network with parameters learned via the act 204 to fill or inpaint pixels in on or more regions of a masked digital image. As shown, the structure-aware inpainting system 102 receives or otherwise identifies a masked digital image with a rectangular mask designating pixels to inpaint from an image of a koala. In turn, the structure-aware inpainting system 102 further applies the trained generative inpainting neural network to identify replacement pixels from the digital image and generates content to "inpaint" the hole region indicated by the rectangular digital image mask.

Figure 3A:
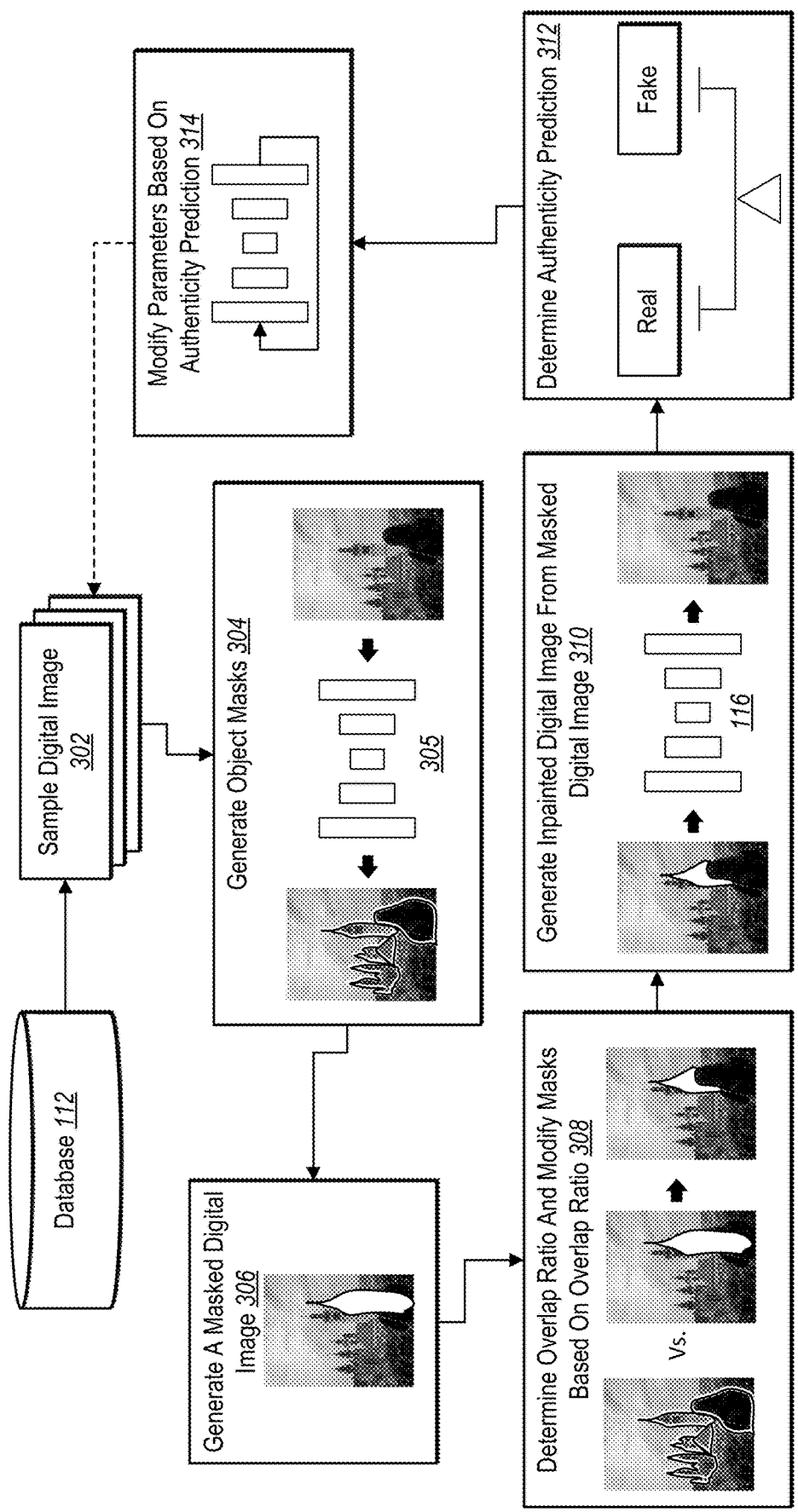
Figure 3B:
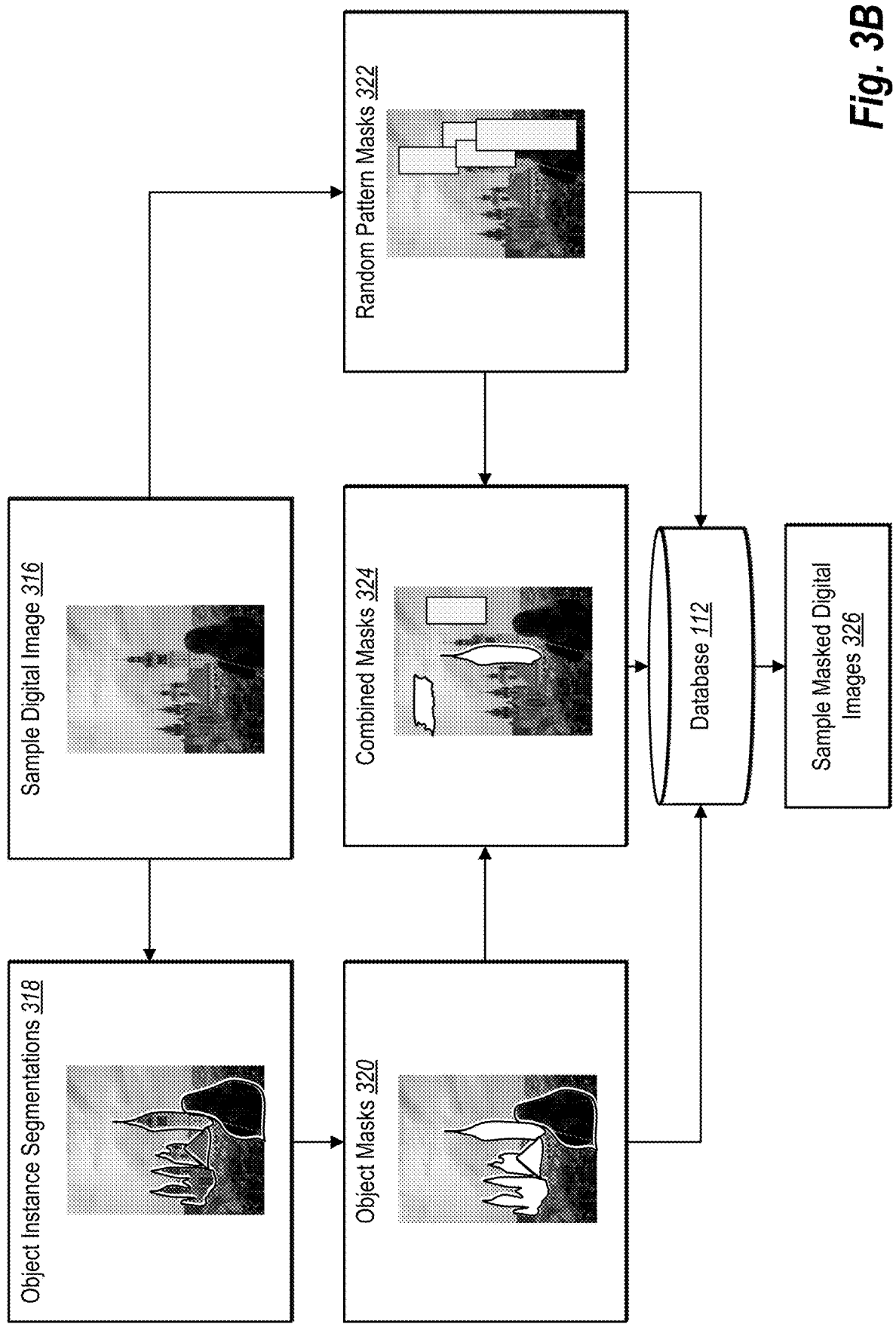
Figure 3D:
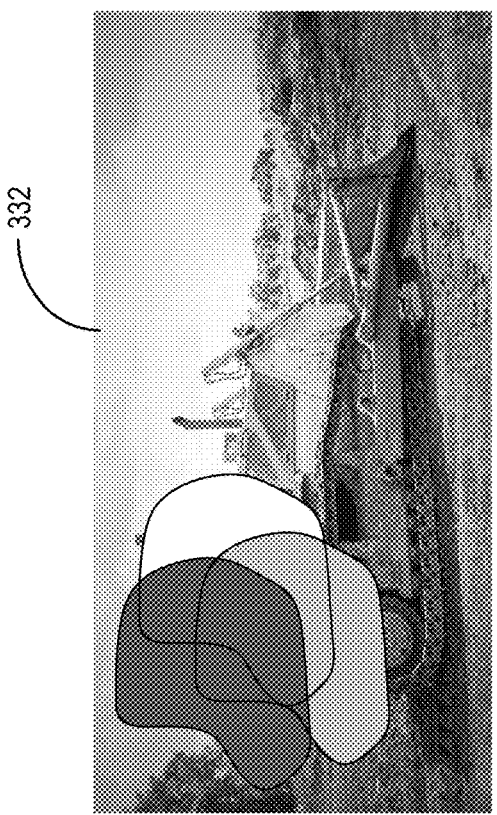
Figure 3D:
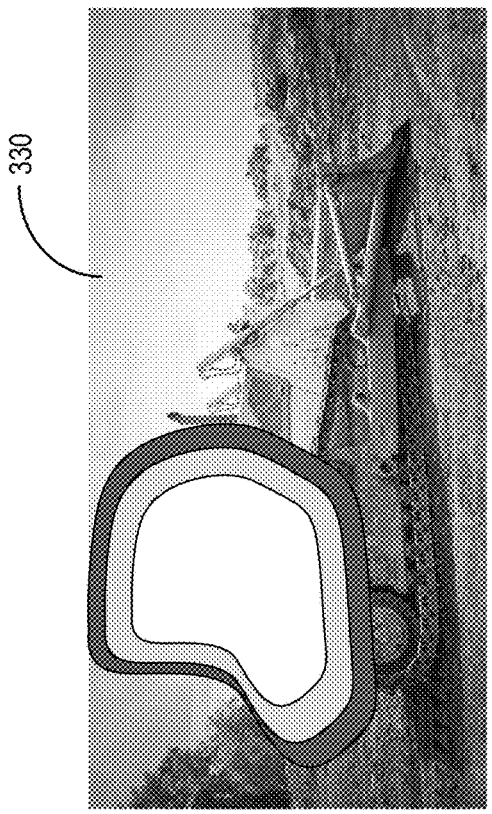
Figure 3E:
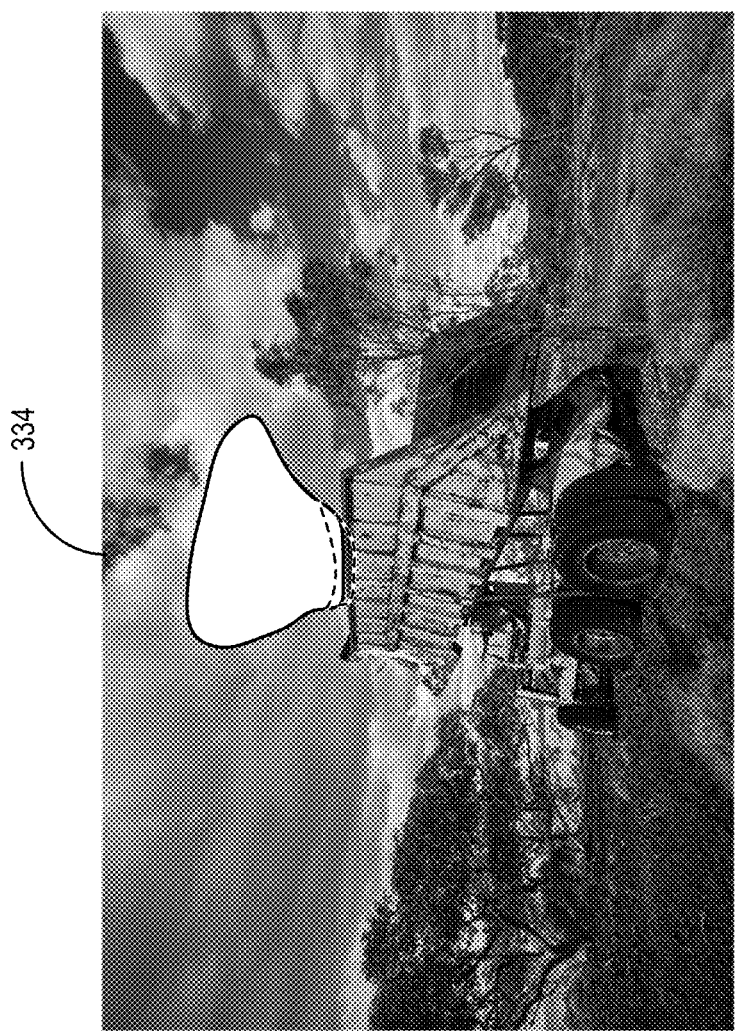

As mentioned above, in certain described embodiments, the structure-aware inpainting system 102 utilizes object-aware training techniques as part of learning parameters for a generative inpainting neural network. In particular, the structure-aware inpainting system 102 generates object masks for individual object instances and utilizes masked object instances as part of the parameter learning process. FIGS. 3A-3E illustrate example steps involved in object-aware training in accordance with one or more embodiments. Specifically, FIG. 3A illustrates a sequence of acts for object-aware training in accordance with one or more embodiments. Additionally, FIG. 3B illustrates an example of generating digital image masks and sampling masked digital images in accordance with one or more embodiments. Further, FIG. 3C illustrates an example of determining an overlap ratio and modifying digital image masks based on the overlap ratio in accordance with one or more embodiments. Thereafter, FIG. 3D illustrates additional object-aware training techniques for dilating and translating a masked object instance in accordance with one or more embodiments. FIG. 3E illustrates an additional object-aware training technique for dilating a digital image mask along a segmentation boundary in accordance with one or more embodiments.

As illustrated in FIG. 3A, the structure-aware inpainting system 102 identifies or accesses a sample digital image 302. For example, the structure-aware inpainting system 102 retrieves the sample digital image 302 from a dataset of training digital images stored within the database 112. In some cases, the structure-aware inpainting system 102 utilizes a particular dataset such as the Places dataset or the Places2 dataset (or some other dataset). While the images used throughout FIG. 3A are of different scenes and objects, this is merely illustrative and exemplary, and the images and masks may vary across different embodiments or implementations.

As further illustrated in FIG. 3A, the structure-aware inpainting system 102 performs an act 304 to generate object masks. More specifically, the structure-aware inpainting system 102 generates object masks that mask individual instances of various objects depicted within the sample digital image 302. For instance, the structure-aware inpainting system 102 utilizes a segmentation model to determine or generate object instance segmentations within the sample digital image 302. As mentioned above, in one or more embodiments, the structure-aware inpainting system 102 generates the object instance segmentations utilizing a segmentation model, such as a panoptic segmentation neural network 305. A panoptic segmentation neural network 305 segments all object instances in a digital image not only foreground or salient objects.

By utilizing a panoptic segmentation neural network 305, in one or more implementations, the structure-aware inpainting system 102 ensures that foreground objects are not always occluded during training (thereby preventing the generative inpainting neural network from learning accurate object competition). In one or more implementations, the panoptic segmentation neural network 305 comprises a panoptic segmentation neural network as described in U.S.

patent application Ser. No. 17/319,979, filed on May 13, 2021 and entitled "GENERATING IMPROVED PANOPTIC SEGMENTED DIGITAL IMAGES BASED ON PANOPTIC SEGMENTATION NEURAL NETWORKS THAT UTILIZE EXEMPLAR UNKNOWN OBJECT CLASSES," the entire contents of which are hereby incorporated by reference. In still further implementations, the panoptic segmentation neural network 305 comprises a class-agnostic object segmentation neural network as described in U.S. patent application Ser. No. 17/151,111, filed on Jan. 15, 2021 and entitled "GENERATING CLASS-AGNOSTIC SEGMENTATION MASKS IN DIGITAL IMAGES," the entire contents of which are hereby incorporated by reference. In still further implementations, the panoptic segmentation neural network 305 comprises the panoptic segmentation neural network ("PanopticFCN") described by Yanwei Li et al. in *Fully Convolutional Networks for Panoptic Segmentation*, Proceedings of the IEEE/CVF Conf. on Computer Vision and Pattern Recognition (2021), the entire contents of which are hereby incorporated by reference.

Having generated the object instance segmentations, the structure-aware inpainting system 102 converts one or more of the object instance segmentations into a mask to generate an object mask. A mask refers to an indication of a plurality of pixels portraying an object. For example, an object mask includes a segmentation boundary (e.g., a boundary line or curve indicating the borders of one or more objects) or a segmentation mask (e.g., a binary mask identifying pixels corresponding to an object vs those that do not).

In some cases, the structure-aware inpainting system 102 generates digital image masks other than (or in addition to) object masks. For some sample digital images for example, the structure-aware inpainting system 102 generates random pattern masks that depict masks in the shape of random strokes, rectangles (or other shapes), or a combination of random strokes and rectangles. By generating digital image masks including both object masks and random pattern masks, the structure-aware inpainting system generates a set of masked digital images to use as a basis for training a generative inpainting neural network.

As further shown, the structure-aware inpainting system 102 performs an act 306 to generate a masked digital image. In particular, the structure-aware inpainting system 102 randomly (or according to some probability or sampling technique) selects one or more masks by sampling from among the set of masks that includes object masks, random masks, and optionally combinations thereof. Thus, in some iterations, the structure-aware inpainting system 102 selects a masked object instance, in other iterations the structure-aware inpainting system 102 selects a random pattern mask, and in still further iterations, the structure-aware inpainting system 102 selections a combination thereof.

Additionally, the structure-aware inpainting system 102 performs an act 308 to determine an overlap ratio and modify masks based on the overlap ratio. More specifically, the structure-aware inpainting system 102 determines an overlap ratio between a hole region (or a digital image mask indicating a hole region) and each object instance identified within a selected masked digital image (or the sample digital image 302). For example, the structure-aware inpainting system 102 determines an amount or a percentage of an object that is occluded or covered by a mask or a hole to be inpainted or filled. Indeed, the structure-aware inpainting system 102 determines an overlap ratio to identify one or more object instances that are substantially or significantly covered by a mask and that might impact pixel sampling for inpainting as a result (e.g., for completion of an object that is partially occluded and/or to prevent generating nonsensical artifacts when inpainting).

In some cases, the structure-aware inpainting system 102 further compares the overlap ratio with an overlap ratio threshold. For instance, the structure-aware inpainting system 102 compares the overlap ratio with the overlap ratio threshold to determine whether to exclude the object instance from the mask or hole. As an example, as shown in FIG. 3A, the structure-aware inpainting system 102 has determined that an overlap ratio of the girl in the foreground and to object mask exceeds the overlap ratio threshold and therefore modifies the masked digital image by excluding the girl in the foreground from the object mask. By so doing, the structure-aware inpainting system 102 prevents sampling pixels of objects that are largely covered by a mask and which might therefore cause nonsensical artifacts to be inpainted in the hole. If the structure-aware inpainting system 102 determines that the overlap ratio is less than the overlap ratio threshold, on the other hand, the structure-aware inpainting system 102 leaves the mask unchanged to mimic or perform object completion (e.g., by inpainting pixels to inpaint the covered portion of an object).

As further illustrated in FIG. 3A, the structure-aware inpainting system 102 performs an act 310 to generate an inpainted digital image from a masked digital image. For instance, the structure-aware inpainting system 102 generates an inpainted digital image utilizing a generative inpainting neural network 116 to fill or inpaint a hole region (indicated by a digital image mask) by generating replacement pixels. Indeed, the structure-aware inpainting system 102 utilizes a generative inpainting neural network 116 to, according to its internal parameters such as weights and biases, generates replacement pixels and to fill the hole region.

In one or more implementations, the generative inpainting neural network 116 comprises the ProFill model described by Y. Zeng et al. in *High-Resolution Image Inpainting with Iterative Confidence Feedback and Guided Upsampling*, European Conf. on Computer Vision, 1-17 (2020)) or the DeepFillv2 model described by J. Yu et al., in *Free-Form Image Inpainting with Gated Convolution*, Proceedings of IEEE Int'l Conf. on Computer Vision, 4471-80 (2019)), the entire contents of which are hereby incorporated by reference. In still further implementations, the generative inpainting neural network 116 comprises one of the models referenced in relation to FIG. 7 below.

Additionally, the structure-aware inpainting system 102 performs an act 312 to determine an authenticity prediction. In particular, the structure-aware inpainting system 102 utilizes a discriminator neural network to determine whether the inpainted digital image generated via the act 310 is real (e.g., a captured digital image) or fake (e.g., a generated digital image). For instance, the structure-aware inpainting system 102 determines or utilizes an adversarial loss as the discriminator neural network competes with a generator neural network of the generative inpainting neural network. In some cases, the structure-aware inpainting system 102 utilizes a perceptual loss (in addition to the adversarial loss) to compare the inpainted digital image with a sample digital image such as the sample digital image corresponding to the inpainted digital image (e.g., the sample digital image 302 that depicts objects which were later masked via the acts 304 and 306) stored in the database 112.

As further illustrated in FIG. 3A, the structure-aware inpainting system 102 performs an act 314 to modify parameters based on the authenticity prediction. For example, the structure-aware inpainting system 102 modifies parameters (e.g., weights and biases) of the generative inpainting neural network 116 to adjust how the network processes data and improve the inpainting for subsequent iterations. To modify the parameters, in some embodiments, the structure-aware inpainting system 102 backpropagates based on an adversarial loss and/or a perceptual loss. In some cases, the structure-aware inpainting system 102 modifies parameters of an encoder neural network, a generator neural network, and/or a discriminator neural network that are part of the generative inpainting neural network 116.

In one or more embodiments, the structure-aware inpainting system 102 repeats one or more of the acts of FIG. 3A for successive training iterations. For example, the structure-aware inpainting system 102 generates a plurality of masked digital image with object masks, random masks, masks modified based on an overlap ratio etc. For each iteration, the structure-aware inpainting system 102 samples a masked digital image, generates a new inpainted digital image, and modifies parameters based on comparing the new inpainted digital image with a corresponding sample (e.g., real) digital image. In one or more embodiments, the structure-aware inpainting system 102 repeats the training process for many iterations until the generative inpainting neural network generates an inpainted digital image that fools the discriminator neural network into predicting that the inpainted digital image is real.

As mentioned above, in certain described embodiments, the structure-aware inpainting system 102 generates masked digital images for use in training a generative inpainting neural network. In particular, the structure-aware inpainting system 102 generates a set of masked digital images from which to sample for inpainting during training. FIG. 3B illustrates generating and sampling masked digital images in accordance with one or more embodiments. While FIG. 3B illustrates generating different types of digital image masks for a single sample digital image, the structure-aware inpainting system 102 also generates digital image masks of different types for other sample digital images to generate a large corpus of training images.

As illustrated in FIG. 3B, the structure-aware inpainting system 102 identifies, accesses, or receives a sample digital image 316. For example, the structure-aware inpainting system 102 accesses the sample digital image from a database (e.g., the database 112). In addition, the structure-aware inpainting system 102 generates object instance segmentations 318 from which the structure-aware inpainting system 102 generates object masks 320. The structure-aware inpainting system 102 also generates random pattern masks 322 for the sample digital image 316.

For example, the structure-aware inpainting system 102 generates object instance segmentations 318 utilizing a segmentation model to determine object instances within the sample digital image 316 as described above. For instance, the structure-aware inpainting system 102 analyzes pixels of the sample digital image 316 to determine probabilities of different objects appearing within the sample digital image 316 and further labels each instance of each object type based on their respective probabilities. As shown, the structure-aware inpainting system 102 identifies and outlines individual object instances within the sample digital image to generate the object instance segmentations 318. The structure-aware inpainting system 102 further generates object masks 320 that align with one or more object instance segmentations 318.

In addition, the structure-aware inpainting system 102 generates the random pattern masks 322. More specifically, the structure-aware inpainting system 102 generates the random pattern masks 322 by utilizing one or more types of non-object masks. In some cases, the structure-aware inpainting system 102 utilizes random strokes, rectangles (or other shapes), a combination of random strokes and rectangles (or other shapes), or some other type of mask such as those proposed by Shengyu Zhao et al. in *Large Scale Image Completion via Co-Modulated Generative Adversarial Networks*, ArXiv:2103:10428 (2021), the entire contents of which are hereby incorporated by reference. As shown, in one or more embodiments, the structure-aware inpainting system 102 utilizes rectangles to generate the random pattern masks 322 to mask out a portion of the sample digital image 316.

In some embodiments, the structure-aware inpainting system 102 further generates a set of masked digital images for use in training a generative inpainting neural network 116. For example, the structure-aware inpainting system 102 stores the object masks 320, and optionally, the random pattern masks 322 within the database 112. The structure-aware inpainting system 102 further performs an act 325 to sample masked digital images. For example, the structure-aware inpainting system 102 samples an initial mask, which can be a random pattern mask 322 or an object mask 320. In particular, to sample a random pattern mask 322, the structure-aware inpainting system 102 simulates random brush strokes and rectangles as mentioned above. To sample an object mask, the structure-aware inpainting system 102 randomly selections an object mask from the database 112 and randomly scales, translates, and/or dilates the selected object mask. The structure-aware inpainting system 102 also computes the overlap ratio between each object instance and the generated mask. If the overlap ratio is larger than an overlap threshold, the structure-aware inpainting system 102 excludes the object instance from the mask. One will appreciate, that because the structure-aware inpainting system 102 samples object masks from a database of object masks, a sampled object mask may not correspond to object instance in a training digital image to which it is applied (e.g., the sampled object mask will often comprise an object mask generated from another digital image). The structure-aware inpainting system 102 then applies the sampled mask to a training digital image and utilizes the training digital image and sampled mask combination for training a generative inpainting neural network 116.

In one or alternative implementations, the structure-aware inpainting system 102 optionally generates combined masks 324 for use in training the generative inpainting neural network 116. For example, the generative inpainting neural network 116 samples one or more random pattern masks 322 and one or more object masks 320. In such implementations, masked digital image includes one or more object masks 320 together with one or more random pattern masks 322.

As mentioned, in certain embodiments, the structure-aware inpainting system 102 determines an overlap ratio. In particular, the structure-aware inpainting system 102 compares a digital image mask with the object instance segmentations for a digital image to determine an overlap ratio. FIG. 3C illustrates modifying (or refraining from modifying) digital image masks based on an overlap ratio in accordance with one or more embodiments.

As illustrated in FIG. 3C, the structure-aware inpainting system 102 performs an act 326a to determine an overlap ratio for a masked digital image depicting part of a tractor (or combine) in a field. As shown, the structure-aware inpainting system 102 determines a relatively large overlap ratio by comparing the area occupied by the square mask to the area occupied by the tractor object instance as indicated by the dashed outline. Indeed, the structure-aware inpainting system 102 determines how much (or what percentage or proportion) of the object instance (the tractor) is covered by the square mask. To determine an overlap ratio, in some embodiments, the structure-aware inpainting system 102 determines, for each object instance $s_i$ within a sample digital image x, an overlap ratio given by:

$$r_i = \frac{\text{Area}(m, s_i)}{\text{Area}(s_i)}$$

where $r_i$ represents the overlap ratio, Area(m, $s_i$) represents an area occupied by the initial mask m (e.g., a digital image mask indicating a hole region to inpaint), and Area($s_i$) represents an area occupied by an object instance $s_i$.

The structure-aware inpainting system 102 further compares the overlap ratio with an overlap ratio threshold. More particularly, the structure-aware inpainting system 102 compares the overlap ratio with a threshold that indicates whether to exclude the occluded object instance or include with occluded object instance from the digital image mask. Indeed, if the structure-aware inpainting system 102 determines that the overlap ratio meets or exceeds the overlap ratio threshold, the structure-aware inpainting system 102 excludes the object instance from the mask, as given by: m←m−$s_i$ to mimic the distractor removal use case. More specifically, the structure-aware inpainting system 102 compares the overlap ratio with an overlap ratio threshold of 0.5 (or 50%) or another threshold such as 0.2, 0.3, 0.6, 0.7, etc. As shown, the structure-aware inpainting system 102 determines that the overlap ratio as determine via the act 326a is greater than the overlap threshold. Consequently, the structure-aware inpainting system 102 performs an act 327 to exclude the object instance from the mask. As depicted, the structure-aware inpainting system 102 thus modifies the mask to carve out the portion occupied by the pixels of the object instance, masking only the remaining pixels not occupied by the formerly occluded object instance. The structure-aware inpainting system 102 thus refrains from sampling pixels of the occluded object when inpainting, thereby preventing generation of nonsensical artifacts and improving the quality of the result.

As further illustrated in FIG. 3C, the structure-aware inpainting system 102 performs an act 326b to determine an overlap ratio for a masked digital image of a tractor with a smaller square mask. As shown, the structure-aware inpainting system 102 determines a smaller overlap ratio via the act 326b than for the act 326a. In addition, the structure-aware inpainting system 102 compares the overlap ratio with an overlap ratio threshold. As a result of the comparison, the structure-aware inpainting system 102 determines that the overlap ratio determined via the act 326b is not greater than the overlap ratio threshold. The structure-aware inpainting system 102 therefore performs the act 328 to include the object instance. Specifically, the structure-aware inpainting system 102 leaves the digital image mask as-is, refraining from modifying the mask and including the portion of the object instance occluded by the mask as part of the mask. In some cases, the structure-aware inpainting system 102 performs more accurate object completion by utilizing the overlap ratio and the overlap ratio threshold to sample pixels of occluded objects when completing them (e.g., in cases where they are covered less than a threshold amount).

As mentioned above, in certain embodiments, the structure-aware inpainting system 102 further improves or modifies the object-aware training by translating and/or dilating masks of individual objects within digital images. In particular, the structure-aware inpainting system 102 dilates and/or translates an object mask (or a masked object instance) to prevent or reduce sampling pixels within a hole region (e.g., to avoid overfitting). FIG. 3D illustrates example dilations and translations of an object mask in accordance with one or more embodiments.

As illustrated in FIG. 3D, the structure-aware inpainting system 102 dilates an object mask, as indicated in the digital image 330. To elaborate, the structure-aware inpainting system 102 dilates a digital image mask (e.g., indicated by the differently sized masks shaped like blobs) within the digital image 330 to help train a generative inpainting neural network to generate inpainted digital images by sampling from regions of different sizes (over various iterations) to avoiding overfitting. In some cases, the structure-aware inpainting system 102 randomly dilates a digital image mask such as an object instance mask or a random pattern mask (e.g., to increase or decrease its size by a random width and/or random number of times) to prevent the generative inpainting neural network from inpainting pixels that look too much like the masked object. In these or other cases, the structure-aware inpainting system 102 dilates a digital image mask within particular size bounds (e.g., not smaller than a lower limit and not larger than an upper limit). As shown, the digital image 330 includes three masks of different sizes, though this is merely illustrative (and each dilation would be for a different training iteration).

To further prevent overfitting, as further illustrated in FIG. 3D, the structure-aware inpainting system 102 translates a digital image mask (in addition or alternatively to dilating), as indicated in the digital image 332. To elaborate, the structure-aware inpainting system 102 uses random circular translation to translate (and/or rotate) a digital image mask such as an object instance mask or a random pattern mask. In some embodiments, the structure-aware inpainting system 102 uses a different translation to, for example, translate a mask by a random number of pixels in a random direction. In some cases, the structure-aware inpainting system 102 translates a mask within certain distance bounds (e.g., beneath an upper distance limit in a given direction) to avoid sampling pixels that differ too greatly from those of the masked object while also preventing the generative inpainting neural network from inpainting pixels that match the masked object too closely. Indeed, by translating an object mask, the structure-aware inpainting system 102 avoids rigid or strict boundaries for inpainting the hole region of a digital image mask for smoother, more accurate results. As shown, the digital image 332 includes three masks in different locations, though this is merely illustrative, and more or fewer masks are possible in different locations.

As further mentioned above, in certain embodiments, the structure-aware inpainting system 102 improves or modifies object-aware training by dilating a digital image mask along a segmentation boundary. In particular, the structure-aware inpainting system 102 randomly (or by a specified amount) dilates a hole region to prevent color bleeding or leaking of background pixels into object pixels of an inpainted region. FIG. 3E illustrates an example of dilating a digital image mask or a hole region along a segmentation boundary in accordance with one or more embodiments. The dilated digital image masks of FIG. 3E are an example for discussion purposes, and different shapes, numbers, sizes, and other variations are possible.

As illustrated in FIG. 3E, the structure-aware inpainting system 102 randomly (or by a specified amount) dilates a hole region or a digital image mask within the digital image 334. For instance, the structure-aware inpainting system 102 dilates a digital image mask along a segmentation boundary (e.g., as indicated by a segmentation neural network). Thus, for successive training iterations, the structure-aware inpainting system 102 utilizes masks of varying size and/or shape (as indicated by the variation of the different dashed lines along a segmentation boundary for the dump truck object instance in the digital image 334) for inpainting the same hole region to ensure more robust pixel sampling, especially in areas near the boundary of the hole or mask. By dilating the digital image mask in this way, the structure-aware inpainting system 102 prevents or reduces pixel bleeding or leaking and generates more accurate, higher quality inpainted digital images.

Figure 4:
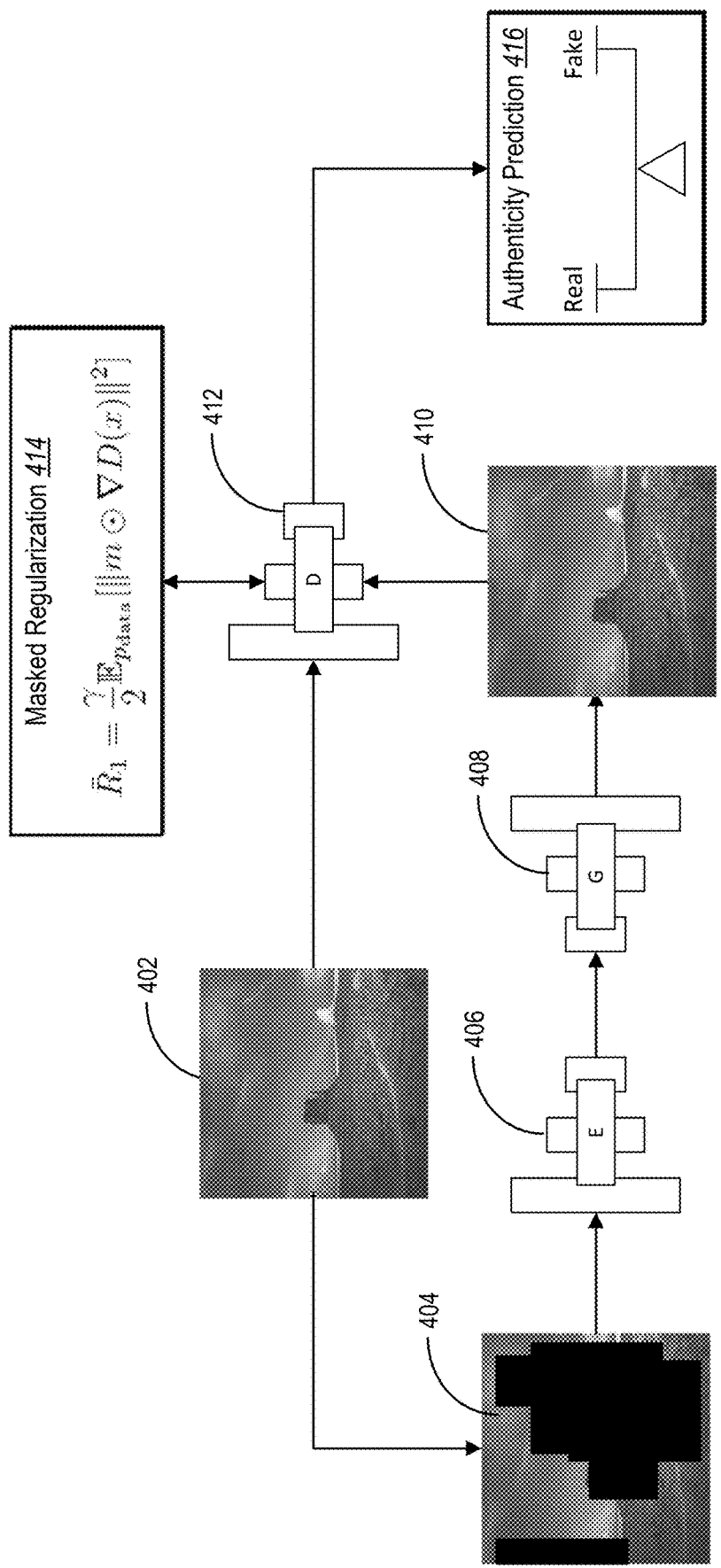
FIG. 4 illustrates an example of training via masked regularization in accordance with one or more embodiments.

As mentioned, in certain described embodiments, the structure-aware inpainting system 102 utilizes masked regularization in addition (or alternatively) to object-aware training. In particular, the structure-aware inpainting system 102 utilizes masked regularization to penalize a discriminator neural network from overfitting during training. FIG. 4 illustrates a sequence of acts for utilizing masked regularization as part of training a generative inpainting neural network in accordance with one or more embodiments.

As illustrated in FIG. 4, the structure-aware inpainting system 102 accesses (e.g., receives or retrieves from the database 112) a sample digital image 402. In addition, the structure-aware inpainting system 102 generates a masked digital image 404 from the sample digital image 402 by, for example, generating an object mask for masking one or more object instances or generating a random pattern mask from random (free-form) strokes and/or rectangles. As shown, the structure-aware inpainting system 102 further inputs the masked digital image 404 into an encoder neural network 406 (as part of a generative inpainting neural network), whereupon the encoder neural network 406 extracts or encodes a feature vector from the masked digital image 404.

In addition, the structure-aware inpainting system 102 passes the encoded feature vector to a generator neural network 408 (as part of the generative inpainting neural network). The generator neural network 408 further generates an inpainted digital image 410 from the encoded feature vector extracted by the encoder neural network 406. Additionally, the structure-aware inpainting system 102 utilizes a discriminator neural network 412 to compare the inpainted digital image 410 with the sample digital image 402. By comparing the inpainted digital image 410 with the sample digital image 402 the discriminator neural network 412 generates an authenticity prediction 416 that indicates whether the inpainted digital image 410 is real or fake. Indeed, the structure-aware inpainting system 102 utilizes an adversarial loss to compare the inpainted digital image 410 and the sample digital image 402. In some cases, the structure-aware inpainting system 102 further utilizes a perceptual loss in addition (or alternatively) to the adversarial loss. Indeed, the perceptual loss and/or the adversarial loss is optionally part of the object-aware training and/or the masked regularization for modifying parameters of a generative inpainting neural network.

To generate the authenticity prediction 416, in some case, the structure-aware inpainting system 102 utilizes masked regularization 414 to regularize how the discriminator neural network 412 processes data for comparing the inpainted digital image 410 with the sample digital image 402. To elaborate, the structure-aware inpainting system 102 utilizes a masked regularization to stabilize adversarial training by penalizing the discriminator neural network 412 from overfitting.

For example, the structure-aware inpainting system 102 utilizes an R1 regularization but modifies the R1 regularization utilizing a digital image mask. Specifically, the structure-aware inpainting system 102 utilizes a masked R1 regularization specifically designed for inpainting, where incorporating the digital image mask into the regularization avoids computing a gradient penalty inside the mask region and reduces the harmful impact of computing regularization outside of holes. In some cases, the structure-aware inpainting system 102 utilizes a masked R1 regularization given by:

$$\bar{R}_1 = \frac{\gamma}{2} \mathbb{E}_{p_{data}} \left[ \| m \odot \nabla D(x) \|^2 \right]$$

where $\bar{R}_1$ represents an R1 regularization term, m represents a digital image mask indicating a hole region to inpaint, $\gamma$ represents a balancing weight, $\mathbb{E}_{p_{data}}$ represents a sampling of images (e.g., sample digital images) from real images, and D(x) represents an output of the discriminator neural network 412 (e.g., the authenticity prediction 416).

Based on the authenticity prediction 416, in certain embodiments, the structure-aware inpainting system 102 back propagates to modify or update parameters of the encoder neural network 406, the generator neural network 408, and/or the discriminator neural network 412. For example, the structure-aware inpainting system 102 modifies internal weights and biases associated with one or more layers or neurons of the encoder neural network 406, the generator neural network 408, and/or the discriminator neural network 412 to reduce a measure of loss (e.g., adversarial loss and/or perceptual loss). By reducing one or more measures of loss, the structure-aware inpainting system 102 improves the inpainting of the generative inpainting neural network (by improving the encoder neural network 406 and/or the generator neural network 408) to reduce one or more measures of loss for fooling the discriminator neural network 412.

Figure 5:
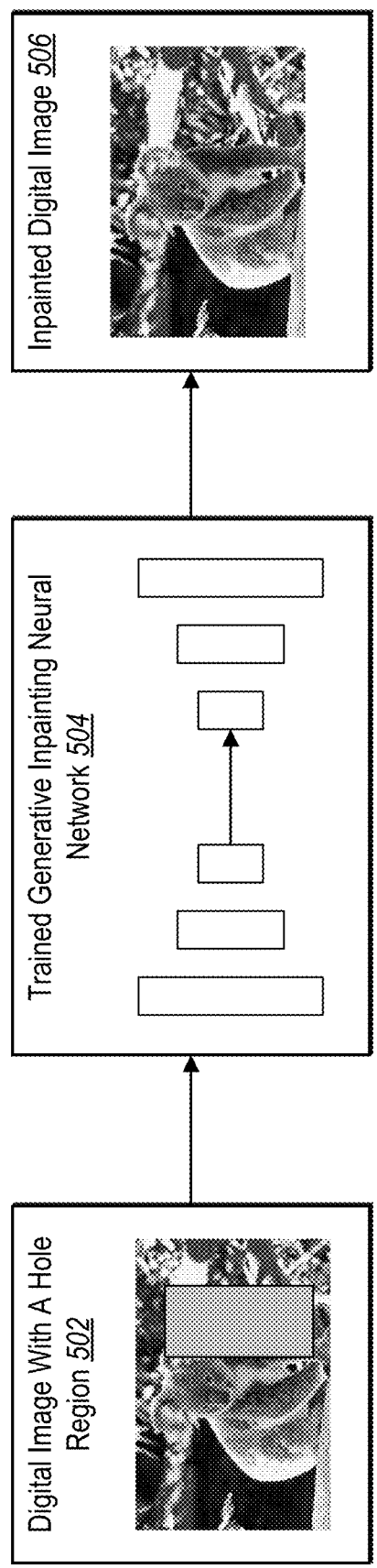
FIG. 5 illustrates an example of utilizing a trained generative inpainting neural network to generate an inpainted digital image in accordance with one or more embodiments.

As mentioned above, in certain described embodiments, the structure-aware inpainting system 102 generates an inpainted digital image by inpainting a hole region of an initial digital image. In particular, the structure-aware inpainting system 102 utilizes a trained generative inpainting neural network with parameters learned via one or more of object-aware training and/or masked regularization. FIG. 5 illustrates generating an inpainted digital image utilizing a trained generative inpainting neural network in accordance with one or more embodiments.

As illustrated in FIG. 5, the structure-aware inpainting system 102 accesses or receives (e.g., from the client device 108) a digital image 502 that depicts a hole or a mask of pixels to inpaint. For example, the structure-aware inpainting system 102 receives the digital image 502 via upload and/or in response to user interaction selecting an object or some other portion of the digital image 502 to remove or replace (e.g., as indicated by the rectangular hole). In some cases, the structure-aware inpainting system 102 utilizes a segmentation neural network to indicate object segmentations or object masks (for each object instance) within the digital image 502. The structure-aware inpainting system 102 further receives a user selection of an object mask (or an object segment) from among the instance-specific object masks as a region to inpaint. In some embodiments, the structure-aware inpainting system 102 receives a different user selection (e.g., a click and drag of a rectangle or a lasso of a particular area of pixels) indicating a region to inpaint.

In addition, the structure-aware inpainting system 102 utilizes a trained generative inpainting neural network 504 (e.g., the generative inpainting neural network 116) to generate an inpainted digital image 506 from the digital image 502. Indeed, the trained generative inpainting neural network 504 accurately generates replacement pixels for filling the hole region and inpaints the hole region with the replacement pixels according to internal network parameters learned via one or more of object-aware training and/or masked regularization. As shown, the inpainted digital image 506 depicts a seamless scene of a koala in a tree.

As mentioned above, in some embodiments, the structure-aware inpainting system 102 improves accuracy over prior systems. Indeed, experimenters have demonstrated that the object-aware training and the masked regularization improve the accuracy of generative inpainting models (of various architectures) in generating inpainted digital images. FIG. 6 illustrates an example table 602 comparing a generative inpainting neural network without masked regularization against a generative inpainting neural network with masked regularization in accordance with one or more embodiments.

Figure 7:
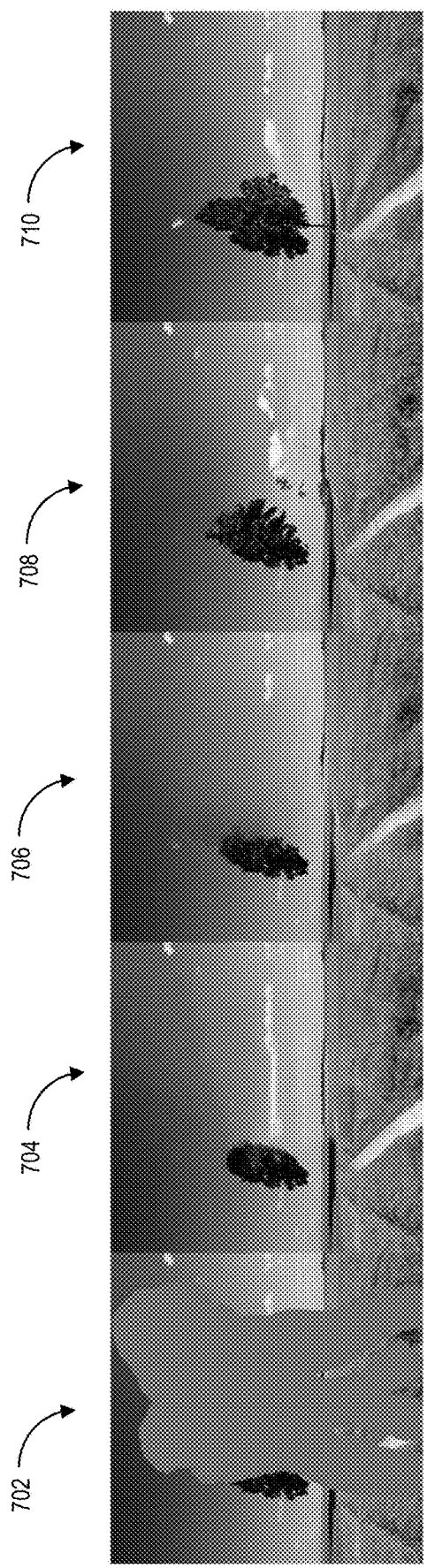
FIG. 7 illustrates an example comparison of inpainted digital images generated by systems with different training techniques in accordance with one or more embodiments.

As illustrated in FIG. 6, the table 602 indicates results of an ablation study using the Places2 evaluation set. Indeed, each neural network of the table 602 was trained using the same dataset, one with masked regularization and one without. As shown, utilizing masked regularization as part of training results in more favorable results during evaluation. For example, the generative inpainting neural network with masked regularization has a lower Frechet Inception Distance (FID) and a higher paired inception discriminative score (P-IDS), both of which indicate a higher degree of accuracy and/or increased image quality. Looking at the results for perceptual image patch similarity distance (LPIPS) and unpaired inception discriminative distance (U-IDS), each neural network has comparable or nearly identical metrics. Based on the table 602, the neural network trained with the masked regularization exhibits better performance. FIG. 7 particularly illustrates visual improvements that result from utilizing the object instance masks described above as part of a training process.

Additionally, in certain embodiments, the structure-aware inpainting system 102 trains neural network with improved accuracy for higher quality results. In particular, the structure-aware inpainting system 102 utilizes object-aware training and/or masked regularization to generate high quality inpainted digital images. FIG. 7 illustrates example inpainted digital images output by several different systems, each with different training procedures in accordance with one or more embodiments. FIG. 7 particularly illustrates visual improvements that result from utilizing the object instance masks described above as part of a training process.

As illustrated in FIG. 7, the structure-aware inpainting system 102 generates the inpainted digital image 710 from the input digital image 702. Indeed, the structure-aware inpainting system 102 generates the inpainted digital image 710 using a generative inpainting neural network with parameters learned via object-aware training. For instance, the structure-aware inpainting system 102 identifies the hole region indicated by the digital image mask, generates replacement pixels utilizing a generative inpainting neural network, and generates the inpainted digital image 710 by filling the hole region with the replacement pixels. By contrast, the inpainted digital images 704, 706, and 708 are generated by systems that do not utilize object-aware training.

Specifically, the inpainted digital image 704 is generated by ProFill as described by Yu Zheng et al in *High-Resolution Image Inpainting with Iterative Confidence Feedback and Guided Upsampling*. In addition, the inpainted digital image 706 is generated by LaMa as described by Roman Suvorov et al. in *Resolution-Robust Large Mask Inpainting with Fourier Convolutions*, arXiv:2109:07161 (2021). In some cases, the LaMa model utilizes salient object masks which, as mentioned above, results in particular issues especially in object completion applications (e.g., because saliency annotation only captures large dominant foreground objects and ignores background objects). Further, the inpainted digital image 708 is generated by CoModGAN as described by Shengyu Zhao et al in *Large Scale Image Completion via Co-Modulated Generative Adversarial Networks*.

As shown, the inpainted digital image 704 includes non-sensical artifacts in the inpainted region, with part of a tree floating in air without a trunk, in addition to unrealistic clouds in a virtually straight line through the inpainted region. Similarly, the inpainted digital image 706 includes an artifact in the form of a floating portion of a tree along with blurry tree colors mixed with sky colors in areas near the tree portion. Additionally, the inpainted digital image 708 depicts multiple floating tree portions disconnected from one another and hovering in the sky. By contrast, the inpainted digital image 710 generated by the structure-aware inpainting system 102 includes high quality detail without artifacts or blurring, where a tree is generated and inpainted with no floating parts and a trunk connecting it to the ground for better visual coherence.

Figure 8:
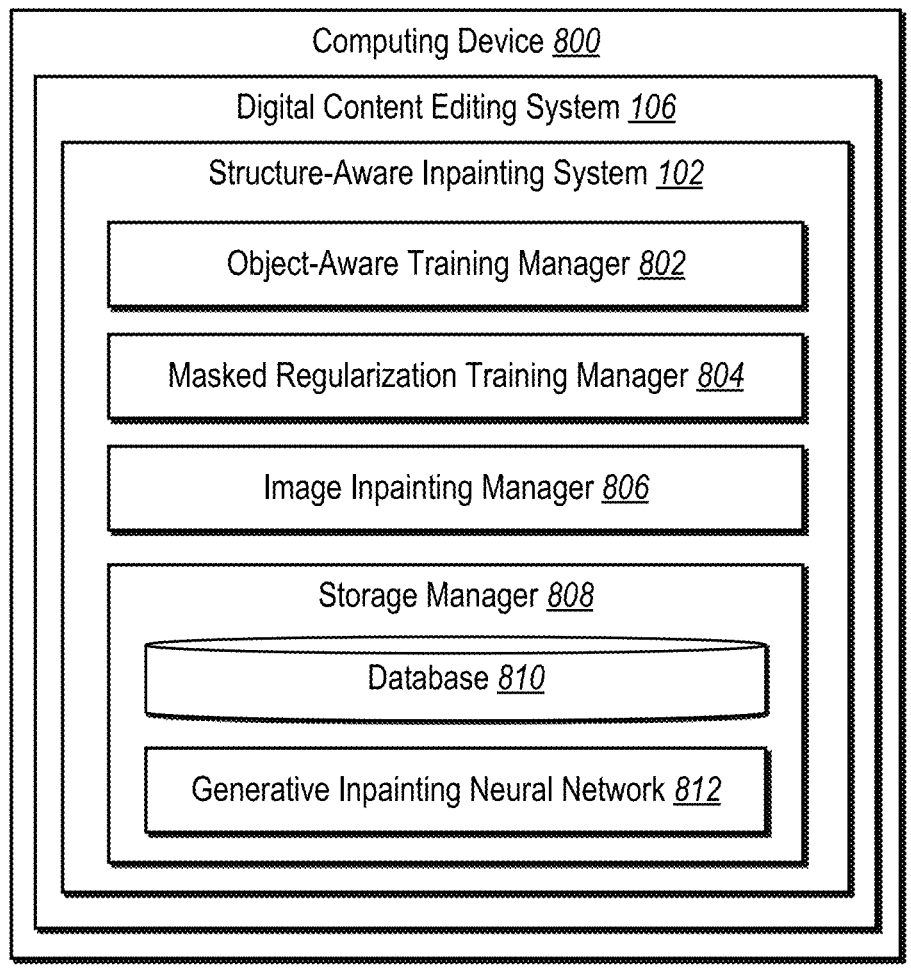
FIG. 8 illustrates a schematic diagram of a structure-aware inpainting system in accordance with one or more embodiments.

Looking now to FIG. 8, additional detail will be provided regarding components and capabilities of the structure-aware inpainting system 102. Specifically, FIG. 8 illustrates an example schematic diagram of the structure-aware inpainting system 102 on an example computing device 800 (e.g., one or more of the client device 108 and/or the server(s) 104). As shown in FIG. 8, the structure-aware inpainting system 102 includes an object-aware training manager 802, a masked regularization training manager 804, an image inpainting manager 806, and a storage manager 808.

As just mentioned, the structure-aware inpainting system 102 includes an object-aware training manager 802. In particular, the object-aware training manager 802 manages, maintains, performs, implements, applies, or utilizes object-aware training techniques to train a generative inpainting neural network 812. For example, the object-aware training manager 802 learns parameters for the object-aware training manager 802 by generating object masks in sample digital images, sampling from masked digital images, determining an overlap ratio, and modifying parameters of the generative inpainting neural network 812 according to the overlap ratio. Additional detail regarding object-aware training is provided above.

As further mentioned, the structure-aware inpainting system 102 includes a masked regularization training manager 804. In particular, the masked regularization training manager 804 manages, maintains, performs, implements, applies, or utilizes masked regularization techniques for training the generative inpainting neural network 812. For example, the masked regularization training manager 804 utilizes the above-described techniques to penalize a discriminator neural network from overfitting by applying a regularization that incorporates a digital image mask for an object instance within a sample digital image.

As shown, the structure-aware inpainting system 102 also includes an image inpainting manager 806. In particular, the image inpainting manager 806 manages, maintains, performs, implements, or applies digital image inpainting to generate an inpainted digital image. For example, the image inpainting manager 806 inpaint or fills one or more hole regions with replacement pixels utilizing the generative inpainting neural network 812 with parameters learned via object-aware training and/or masked regularization.

The structure-aware inpainting system 102 further includes a storage manager 808. The storage manager 808 operates in conjunction with, or includes, one or more memory devices such as the database 810 (e.g., the database 112) that stores various data such as sample digital images for training and/or the generative inpainting neural network 812.

In one or more embodiments, each of the components of the structure-aware inpainting system 102 are in communication with one another using any suitable communication technologies. Additionally, the components of the structure-aware inpainting system 102 is in communication with one or more other devices including one or more client devices described above. It will be recognized that although the components of the structure-aware inpainting system 102 are shown to be separate in FIG. 8, any of the subcomponents may be combined into fewer components, such as into a single component, or divided into more components as may serve a particular implementation. Furthermore, although the components of FIG. 8 are described in connection with the structure-aware inpainting system 102, at least some of the components for performing operations in conjunction with the structure-aware inpainting system 102 described herein may be implemented on other devices within the environment.

The components of the structure-aware inpainting system 102 include software, hardware, or both. For example, the components of the structure-aware inpainting system 102 include one or more instructions stored on a computer-readable storage medium and executable by processors of one or more computing devices (e.g., the computing device 800). When executed by the one or more processors, the computer-executable instructions of the structure-aware inpainting system 102 cause the computing device 800 to perform the methods described herein. Alternatively, the components of the structure-aware inpainting system 102 comprise hardware, such as a special purpose processing device to perform a certain function or group of functions. Additionally, or alternatively, the components of the structure-aware inpainting system 102 include a combination of computer-executable instructions and hardware.

Furthermore, the components of the structure-aware inpainting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the structure-aware inpainting system 102 may be implemented as part of a stand-alone application on a personal computing device or a mobile device. Alternatively, or additionally, the components of the structure-aware inpainting system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-8 the corresponding text, and the examples provide a number of different systems, methods, and non-transitory computer readable media for training a generative inpainting neural network via object-aware training and/or masked regularization for accurate digital image inpainting. In addition to the foregoing, embodiments can also be described in terms of flowcharts comprising acts for accomplishing a particular result. For example, FIGS. 9-11 illustrate flowcharts of example sequences or series of acts in accordance with one or more embodiments.

Figure 9:
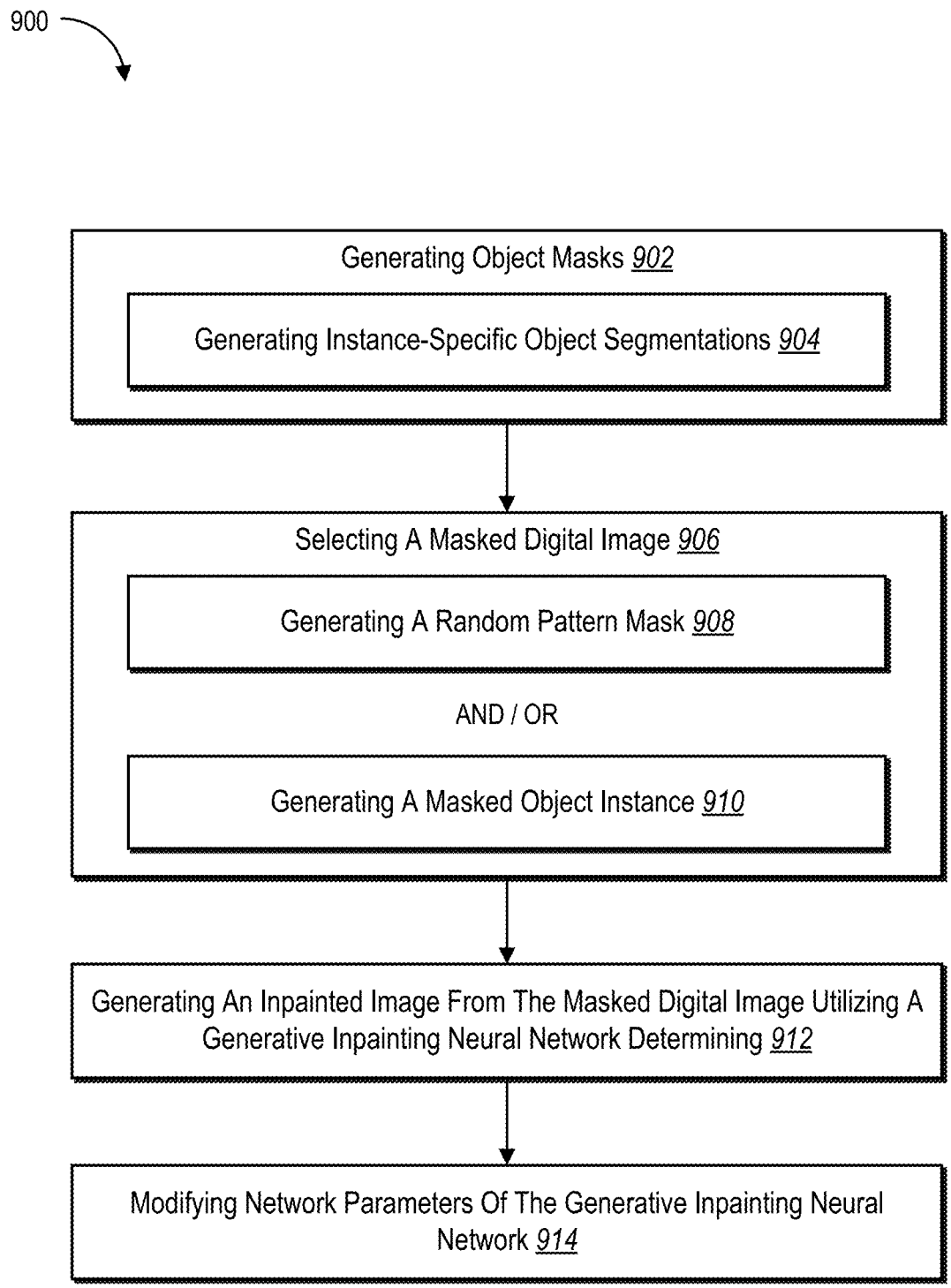
FIG. 9 illustrates a flowchart of a series of acts for learning parameters for a generative inpainting neural network via object-aware training in accordance with one or more embodiments.
Figure 10:
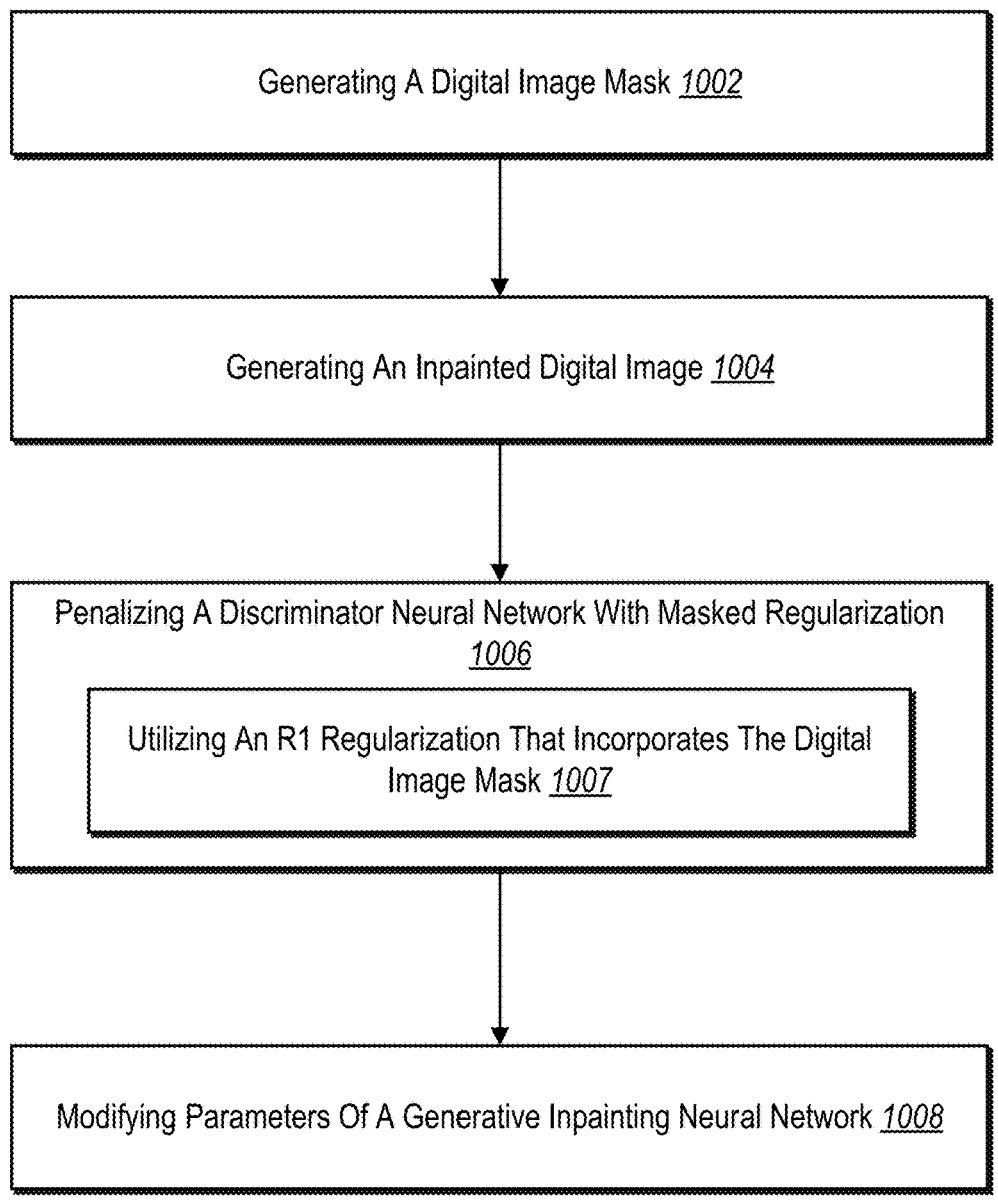
FIG. 10 illustrates a flowchart of a series of acts for learning parameters for a generative inpainting neural network via masked regularization in accordance with one or more embodiments.
Figure 11:
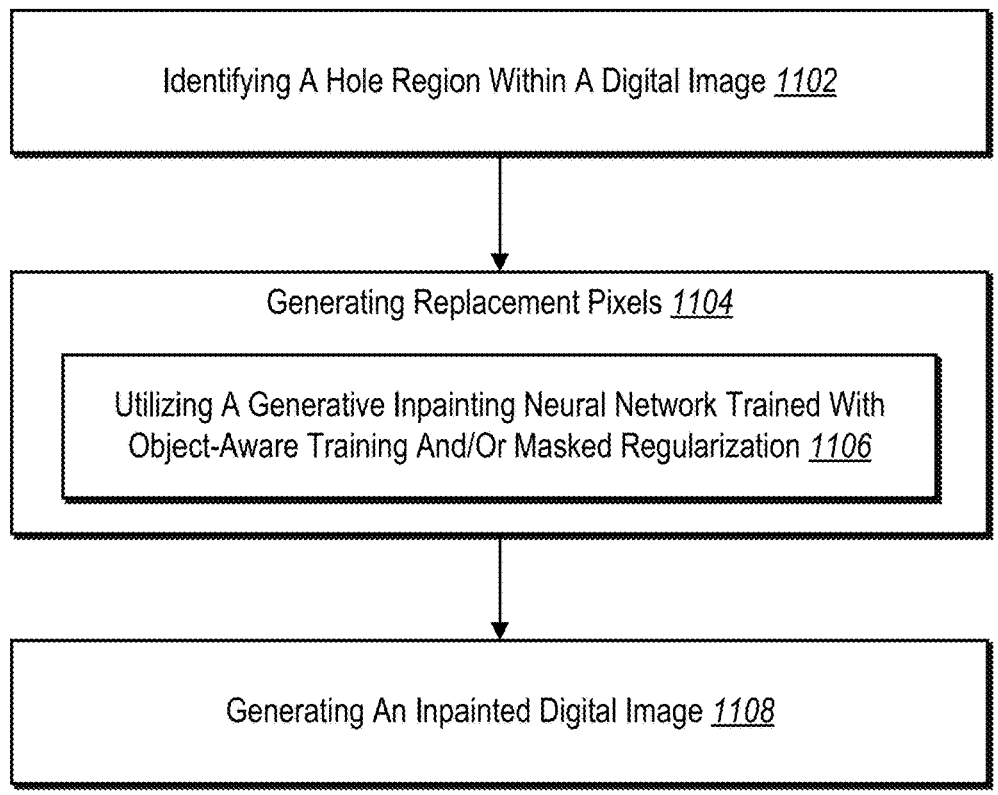
FIG. 11 illustrates a flowchart of a series of acts for utilizing a trained generative inpainting neural network to generate an inpainted digital image in accordance with one or more embodiments.

While FIGS. 9-11 illustrate acts according to particular embodiments, alternative embodiments may omit, add to, reorder, and/or modify any of the acts shown in FIGS. 9-11. The acts of FIGS. 9-11 can be performed as part of a method. Alternatively, a non-transitory computer readable medium can comprise instructions, that when executed by one or more processors, cause a computing device to perform the acts of FIGS. 9-11. In still further embodiments, a system can perform the acts of FIGS. 9-11. Additionally, the acts described herein may be repeated or performed in parallel with one another or in parallel with different instances of the same or other similar acts.

FIG. 9 illustrates an example series of acts 900 for learning parameters for a generative inpainting neural network via object-aware training. In particular, the series of acts 900 includes an act 902 of generating object masks. For example, the act 902 involves an act 904 of generating instance-specific object segmentations. In some cases, the act 902 involves generating a set of object masks for objects within a digital image utilizing a segmentation neural network. In certain embodiments, the act 902 involves generating object masks corresponding to individual object instances depicted within the digital image utilizing a panoptic segmentation neural network. In one or more implementations, the series of acts 900 includes an act of generating the set of masked digital images to include masked digital images depicting masked object instances and additional masked digital images depicting random pattern masks.

As shown, the series of acts 900 includes an act 906 of selecting a masked digital image. In particular, the act 906 includes an act 908 of generating a random pattern mask and/or an act 910 of generating a masked object instance. In one or more embodiments, the act 906 involves selecting a masked digital image from a set of masked digital images depicting masked object instances indicated by the set of object masks for the digital image. Indeed, the act 906 sometimes involves generating a set of masked digital images including random pattern masks and/or masked object instances from which to select.

As further illustrated in FIG. 9, the series of acts 900 includes an act 912 of generating an inpainted digital image from the masked digital image utilizing a generative inpainting neural network. In particular, act 912 involves generating, utilizing the generative inpainting neural network, an inpainted digital image by filling the hole region with the replacement pixels.

As shown, the series of acts 900 includes an act 914 of modifying network parameters of the generative inpainting neural network. In particular, the act 914 includes modifying parameters of the generative inpainting neural network based on a comparison of the inpainted digital image and the digital image (prior to any modification). For example, the act 914 includes backpropagating a loss using gradient based algorithm to update the parameters of the generative inpainting neural network.

In one or more embodiments, the series of acts 900 includes an act of determining an overlap ratio between a digital image mask of the masked digital image and a masked object instance of the masked object instances. The series of acts 900 optionally further involves comparing the overlap ratio with an overlap ratio threshold. In some cases, the series of acts 900 also includes an act of modifying the digital image mask to exclude the masked object instance based on comparing the overlap ratio with the overlap ratio threshold. In these or other embodiments, the series of acts 900 also includes acts of comparing the inpainted digital image with the digital image and modifying the parameters of the generative inpainting neural network according to comparing the inpainted digital image with the digital image.

In certain cases, the series of acts 900 includes an act of reducing overfitting by the generative inpainting neural network by dilating and translating the masked object instance. In these or other cases, the series of acts 900 includes an act of reducing leaking of background pixels into a hole region of the digital image indicated by the digital image mask by dilating the digital image mask along a segmentation boundary indicated by the set of object masks.

FIG. 10 illustrates an example series of acts 1000 for learning parameters for a generative inpainting neural network via masked regularization. In particular, the series of acts 1000 includes an act 1002 of generating a digital image mask. For example, the act 1002 involves generating a digital image mask indicating a hole region within the digital image. In some embodiments, the act 1002 involves generating one or more of a random pattern mask comprising a combination of random strokes and shapes or a masked object instance shaped like an object mask of an object instance depicted within the digital image.

As shown, the series of acts 1000 includes an act 1004 of generating an inpainted digital image. In particular, the act 1004 involves generating an inpainted digital image from the digital image by inpainting the hole region utilizing the generative inpainting neural network.

Additionally, the series of acts 1000 includes an act 1006 of penalizing a discriminator neural network with masked regularization. In particular, the act 1006 includes an act 1007 of utilizing an R1 regularization that incorporates the digital image mask. For instance, the act 1006 involves comparing the inpainted digital image with a digital image utilizing a masked regularization from the digital image mask to penalize the discriminator neural network from overfitting. In certain embodiments, the act 1006 involves comparing the inpainted digital image with an unmodified version of the digital image without the hole region.

Further, the series of acts 1000 includes an act 1008 of modifying parameters of a generative inpainting neural network. In particular, the act 1008 involves modifying parameters of the generative inpainting neural network based on comparing the inpainted digital image with the digital image.

In some cases, the series of acts 1000 includes an act of generating a set of object masks indicating objects depicted within the digital image and an act of generating the digital image mask by generating a masked object instance corresponding to an object instance from among the objects depicted within the digital image. In one or more embodiments, the series of acts 1000 includes acts of determining an overlap ratio between the digital image mask and the masked object instance, generating a modified digital image mask from the digital image mask according to the overlap ratio, and generating the inpainted digital image by inpainting a modified hole region indicated by the modified digital image mask. In certain embodiments, determine the overlap ratio involves comparing mask pixels occupied by the digital image mask with segmentation pixels occupied by the masked object instance.

FIG. 11 illustrates an example series of acts 1100 for generating an inpainted digital image utilizing a generative inpainting neural network trained via object-aware training and/or masked regularization. In particular, the series of acts 1100 includes an act 1102 of identifying a hole region within a digital image. For example, the act 1102 involves utilizing a segmentation neural network to generate object masks for objects within the digital image, receiving a user selection of an object mask, and identifying pixels within the object mask as the hole region.

In addition, the series of acts 1100 includes an act 1004 of generating replacement pixels. For example, the act 1104 includes an act 1106 of utilizing a generative inpainting neural network trained with object-aware training and/or masked regularization. Indeed, the act 1104 involves generating replacement pixels from the digital image to replace the hole region utilizing a generative inpainting neural network comprising parameters learned via one or more of object-aware training or masked regularization.

In some embodiments, the object-aware training includes generating, from a digital image, a set of masked digital images that includes masked digital images depicting object instance masks and masked digital images depicting random pattern masks, selecting a masked digital image from the set of masked digital images, generating an inpainted digital image from the masked digital image, comparing the inpainted digital image with the digital image, and modifying the parameters of the generative inpainting neural network according to comparing the inpainted digital image with the digital image.

In these or other embodiments, the object-aware training involves determining a set of object masks for a digital image utilizing a segmentation neural network, determining an overlap ratio between a digital image mask of the digital image and an object mask from among the set of object masks, and modifying the parameters of the generative inpainting neural network according to the overlap ratio. Comparing the inpainted digital image with the digital image utilizing the masked regularization can include utilizing a discriminator neural network to generate an authenticity prediction associated with the inpainted digital image according to the masked regularization to avoid determining a gradient penalty inside the digital image mask.

In some embodiments, the series of acts 1100 includes an act of learning parameters for the generative inpainting neural network by: generating a digital image mask for a digital image, generating an inpainted digital image from the digital image by inpainting a hole region indicated by the digital image mask, comparing the inpainted digital image with a digital image utilizing a masked regularization obtained from the digital image mask, and modifying the parameters of the generative inpainting neural network according to comparing the inpainted digital image with the digital image.

Further, the series of acts 1100 includes an act 1108 of generating an inpainted digital image. In particular, the act 1108 involves generating, utilizing the generative inpainting neural network, an inpainted digital image by filling the hole region with the replacement pixels.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
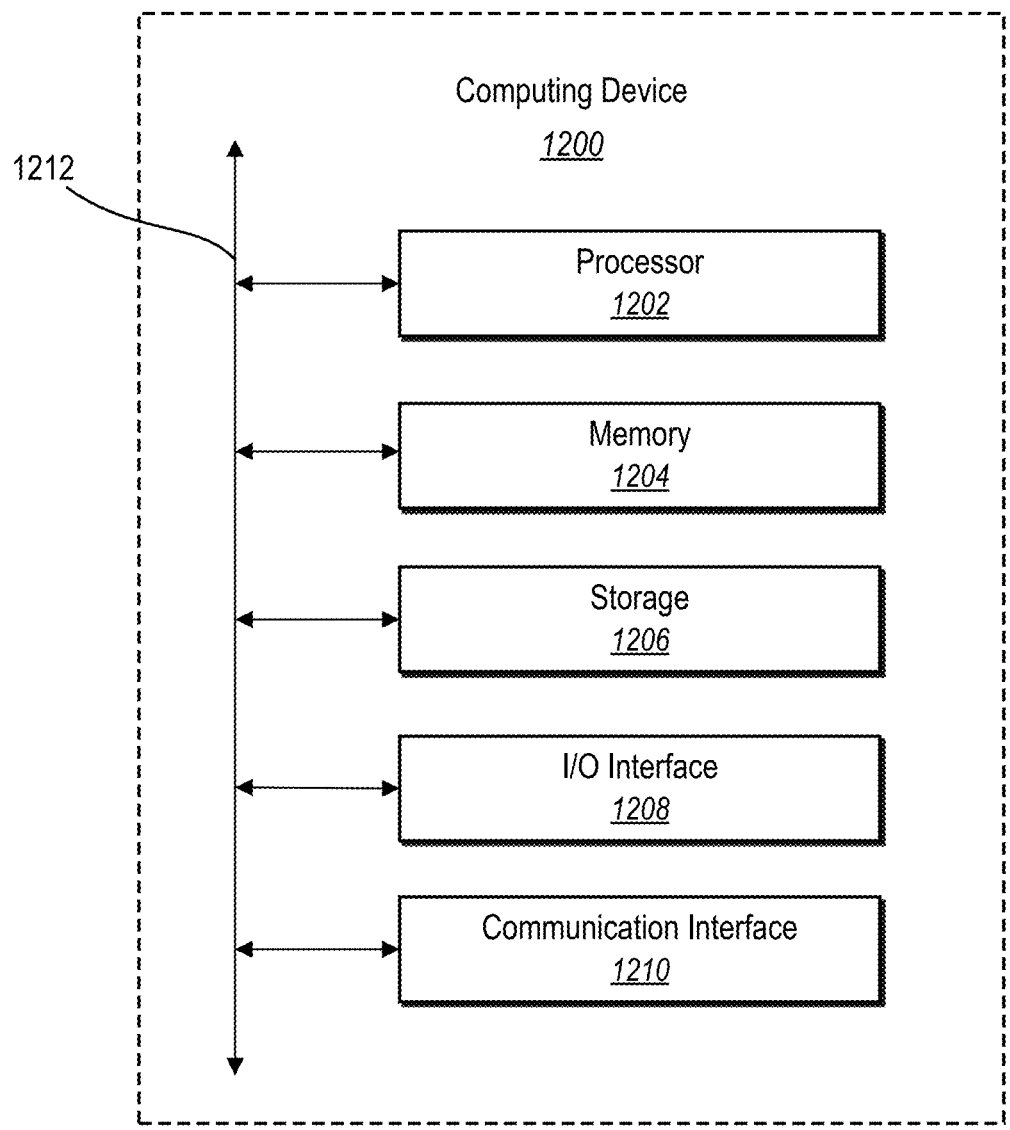
FIG. 12 illustrates a block diagram of an example computing device in accordance with one or more embodiments.

FIG. 12 illustrates, in block diagram form, an example computing device 1200 (e.g., the computing device 800, the client device 108, and/or the server(s) 104) that may be configured to perform one or more of the processes described above. One will appreciate that the structure-aware inpainting system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to perform operations comprising:
   generating a set of object masks for objects within a digital image utilizing a segmentation model;
   selecting a masked digital image from a set of masked digital images depicting masked object instances indicated by the set of object masks for the digital image;
   generating an inpainted digital image from the masked digital image by filling a hole region indicated by a digital image mask of the masked digital image utilizing a generative inpainting neural network comprising a discriminator neural network;
   comparing the inpainted digital image with the digital image utilizing a masked regularization from the digital image mask to penalize the discriminator neural network from overfitting by enforcing computation of gradient penalties on unmasked pixels outside of the digital image mask; and
   modifying parameters of the generative inpainting neural network based on the inpainted digital image according to the masked regularization.

2. The non-transitory computer readable medium of claim 1, further storing instructions that, when executed by the at least one processor, cause the computing device to perform operations comprising:
   determining an overlap ratio between a digital image mask of the masked digital image and a masked object instance of the masked object instances;
   comparing the overlap ratio with an overlap ratio threshold; and
   modifying the digital image mask to exclude the masked object instance based on comparing the overlap ratio with the overlap ratio threshold.

3. The non-transitory computer readable medium of claim 1, wherein generating the set of object masks utilizing the segmentation model comprises generating object masks corresponding to individual object instances depicted within the digital image utilizing a panoptic segmentation neural network.

4. The non-transitory computer readable medium of claim 1, further storing instructions that, when executed by the at least one processor, cause the computing device to generate the set of masked digital images to include masked digital images depicting masked object instances and additional masked digital images depicting random pattern masks.

5. The non-transitory computer readable medium of claim 1, further storing instructions that, when executed by the at least one processor, cause the computing device to perform operations comprising:
determining a perceptual loss; and
modifying the parameters of the generative inpainting neural network according to the perceptual loss.

6. The non-transitory computer readable medium of claim 2, further storing instructions that, when executed by the at least one processor, cause the computing device to perform operations comprising reducing overfitting by the generative inpainting neural network by dilating and translating the masked object instance.

7. The non-transitory computer readable medium of claim 1, further storing instructions that, when executed by the at least one processor, cause the computing device to perform operations comprising reducing leaking of background pixels into a hole region of the digital image indicated by the digital image mask by dilating the digital image mask along a segmentation boundary indicated by the set of object masks.

8. A system comprising:
one or more memory devices comprising a digital image and a generative inpainting neural network comprising a discriminator neural network; and
one or more processors configured to cause the system to:
generate a digital image mask indicating a hole region within the digital image;
generate an inpainted digital image from the digital image by inpainting the hole region utilizing the generative inpainting neural network;
compare the inpainted digital image with the digital image utilizing a masked regularization from the digital image mask to penalize the discriminator neural network from overfitting by enforcing computation of gradient penalties on unmasked pixels outside of the digital image mask; and
modify parameters of the generative inpainting neural network based on comparing the inpainted digital image with the digital image according to the masked regularization.

9. The system of claim 8, wherein utilizing the masked regularization to penalize the discriminator neural network comprises utilizing an R1 regularization that incorporates the digital image mask.

10. The system of claim 8, wherein the one or more processors are further configured to cause the system to:
generate a set of object masks indicating objects depicted within the digital image; and
generate the digital image mask by generating a masked object instance corresponding to an object instance from among the objects depicted within the digital image.

11. The system of claim 10, wherein the one or more processors are further configured to cause the system to:
determine an overlap ratio between the digital image mask and the masked object instance;
generate a modified digital image mask from the digital image mask according to the overlap ratio; and
generate the inpainted digital image by inpainting a modified hole region indicated by the modified digital image mask.

12. The system of claim 11, wherein the one or more processors are further configured to cause the system to determine the overlap ratio by comparing mask pixels occupied by the digital image mask with segmentation pixels occupied by the masked object instance.

13. The system of claim 8, wherein the one or more processors are further configured to cause the system to generate the digital image mask by generating one or more of a random pattern mask comprising a combination of random strokes and shapes or a masked object instance shaped like an object mask of an object instance depicted within the digital image.

14. The system of claim 8, wherein comparing the inpainted digital image with a digital image comprises comparing the inpainted digital image with an unmodified version of the digital image without the hole region.

15. A computer-implemented method comprising:
generating a set of object masks for objects within a digital image utilizing a segmentation model;
selecting a masked digital image from a set of masked digital images depicting masked object instances indicated by the set of object masks for the digital image;
generating an inpainted digital image from the masked digital image by filling a hole region indicated by a digital image mask of the masked digital image utilizing a generative inpainting neural network comprising a discriminator neural network;
comparing the inpainted digital image with the digital image utilizing a masked regularization from the digital image mask to penalize the discriminator neural network from overfitting by enforcing computation of gradient penalties on unmasked pixels outside of the digital image mask; and
modifying parameters of the generative inpainting neural network based on the inpainted digital image according to the masked regularization.

16. The computer-implemented method of claim 15, further comprising:
determining an overlap ratio between a digital image mask of the masked digital image and a masked object instance of the masked object instances;
comparing the overlap ratio with an overlap ratio threshold; and
modifying the digital image mask to exclude the masked object instance based on comparing the overlap ratio with the overlap ratio threshold.

17. The computer-implemented method of claim 15, wherein generating the set of object masks utilizing the segmentation model comprises generating object masks corresponding to individual object instances depicted within the digital image utilizing a panoptic segmentation neural network.

18. The computer-implemented method of claim 15, further comprising:
generating the set of masked digital images to include masked digital images depicting masked object instances and additional masked digital images depicting random pattern masks.

19. The computer-implemented method of claim 15, further comprising:
determining a perceptual loss; and
modifying the parameters of the generative inpainting neural network according to the perceptual loss.

20. The computer-implemented method of claim 16, further comprising reducing overfitting by the generative inpainting neural network by dilating and translating the masked object instance.

* * * * *